US009475663B2

(12) United States Patent
Takata et al.

(10) Patent No.: US 9,475,663 B2
(45) Date of Patent: Oct. 25, 2016

(54) IMAGE FORMING APPARATUS

(71) Applicant: CANON KABUSHIKI KAISHA, Tokyo (JP)

(72) Inventors: Shinichi Takata, Abiko (JP); Hiroshi Matsumoto, Toride (JP); Yushi Oka, Abiko (JP); Ryou Sakaguchi, Toride (JP); Kentaro Tamura, Toride (JP); Shinsuke Ubayashi, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/606,851

(22) Filed: Jan. 27, 2015

(65) Prior Publication Data
US 2015/0210494 A1 Jul. 30, 2015

(30) Foreign Application Priority Data

Jan. 28, 2014 (JP) ................................. 2014-013409

(51) Int. Cl.
| G06F 3/12 | (2006.01) |
| B65H 7/06 | (2006.01) |
| G03G 15/00 | (2006.01) |
| B65H 1/26 | (2006.01) |
| B65H 7/20 | (2006.01) |
| G06K 15/00 | (2006.01) |

(52) U.S. Cl.
CPC ............... *B65H 7/06* (2013.01); *B65H 1/266* (2013.01); *B65H 7/20* (2013.01); *G03G 15/502* (2013.01); *G03G 15/5029* (2013.01); *G03G 15/55* (2013.01); *G03G 15/6508* (2013.01); *B65H 2511/10* (2013.01); *B65H 2511/20* (2013.01); *B65H 2551/20* (2013.01); *G03G 2215/00734* (2013.01); *G06K 15/4065* (2013.01)

(58) Field of Classification Search
None
See application file for complete search history.

(56) References Cited

U.S. PATENT DOCUMENTS

| 5,110,106 A | * | 5/1992 | Matsumura | B65H 7/02 271/171 |
| 5,172,178 A | * | 12/1992 | Oushiden et al. | 399/86 |
| 5,676,370 A | * | 10/1997 | Taniguchi et al. | 271/265.02 |
| 5,678,124 A | * | 10/1997 | Tokura | 399/26 |
| 5,927,707 A | * | 7/1999 | Miura | 271/171 |
| 6,978,114 B2 | * | 12/2005 | Okamoto et al. | 399/389 |
| 7,548,328 B2 | * | 6/2009 | Hult | B41J 11/003 358/1.13 |
| 9,019,522 B2 | * | 4/2015 | Shibata | 358/1.14 |
| 2006/0092451 A1 | * | 5/2006 | Odagiri | 358/1.14 |
| 2009/0040549 A1 | * | 2/2009 | Miyamoto | 358/1.15 |
| 2009/0261524 A1 | * | 10/2009 | Nakayama et al. | 271/3.14 |
| 2013/0099440 A1 | * | 4/2013 | Hikichi | B41J 11/0075 271/9.06 |

(Continued)

FOREIGN PATENT DOCUMENTS

| JP | 7-112844 A | 5/1995 |
| JP | 9-249338 A | 9/1997 |

*Primary Examiner* — Dung Tran
(74) *Attorney, Agent, or Firm* — Canon USA, Inc. IP Division

(57) ABSTRACT

An image forming apparatus includes a stacking portion on which a sheet is to be stacked, an image forming unit, a size detection unit, a setting unit, a notification unit, and a control unit. The image forming unit forms an image on a sheet fed from the stacking portion. The size detection unit detects a size of a sheet stacked on the stacking portion. The setting unit sets at least one sheet size to be allowed for use at the image forming apparatus. The notification unit provides notification of information. The control unit causes the notification unit to provide a warning in a case where the size of the sheet detected by the size detection unit is not included in the at least one sheet size set by the setting unit.

17 Claims, 14 Drawing Sheets

(56) References Cited

U.S. PATENT DOCUMENTS

| | | | |
|---|---|---|---|
| 2013/0135638 A1* | 5/2013 | Inui | 358/1.9 |
| 2013/0215447 A1* | 8/2013 | Harano | 358/1.13 |
| 2014/0268234 A1* | 9/2014 | Iida et al. | 358/1.15 |
| 2015/0235116 A1* | 8/2015 | Inui | B65H 7/06 358/1.15 |

\* cited by examiner

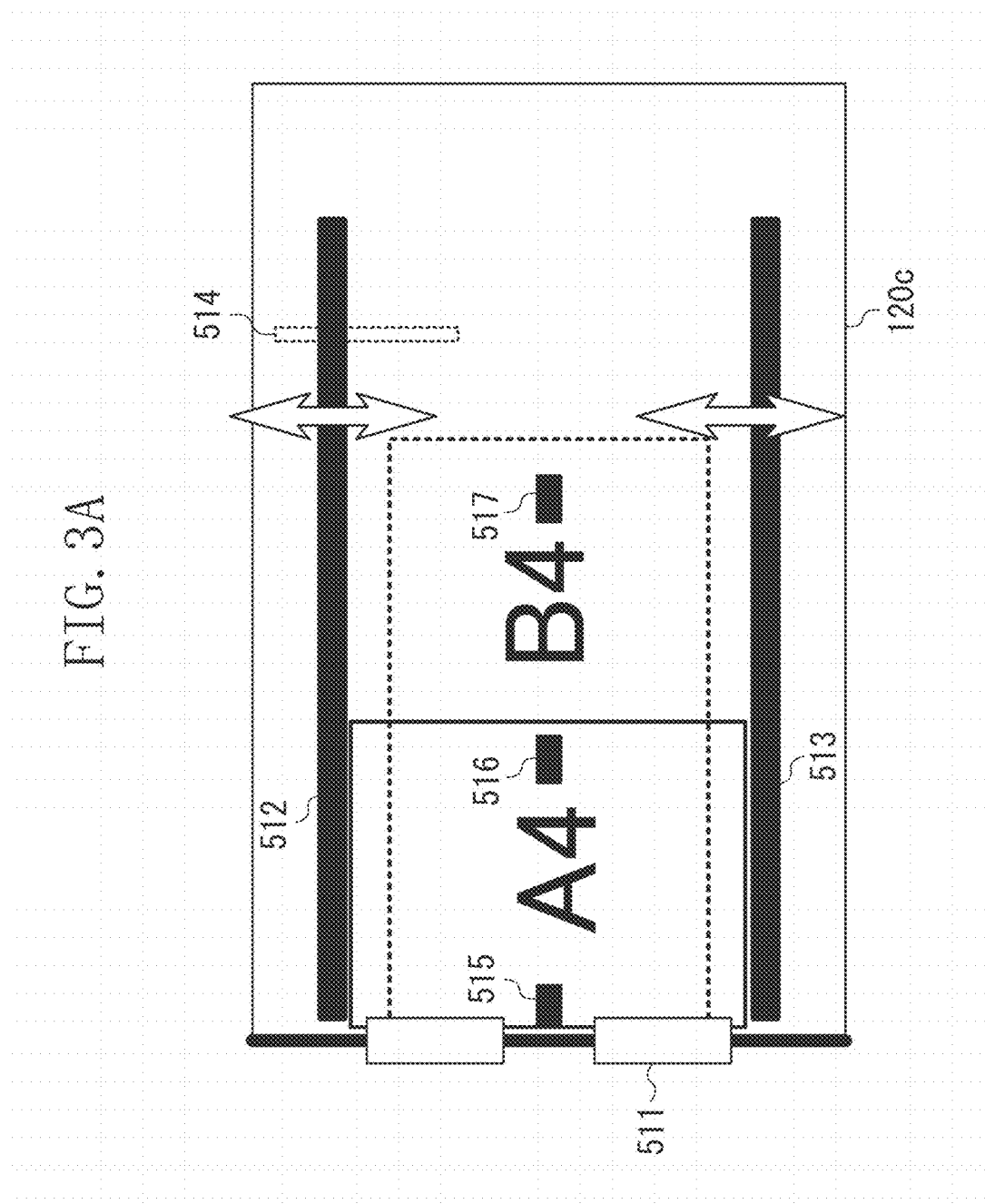

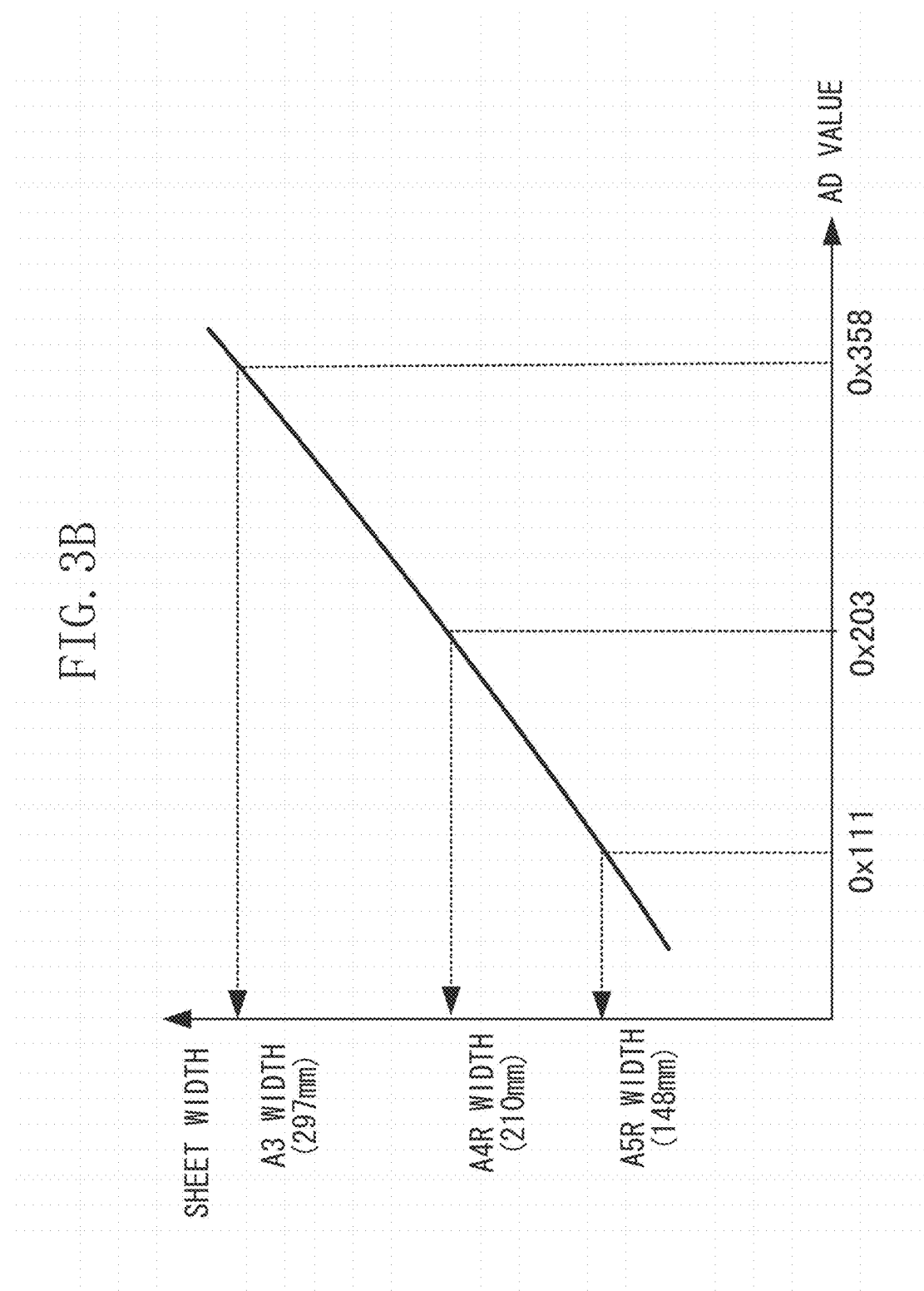

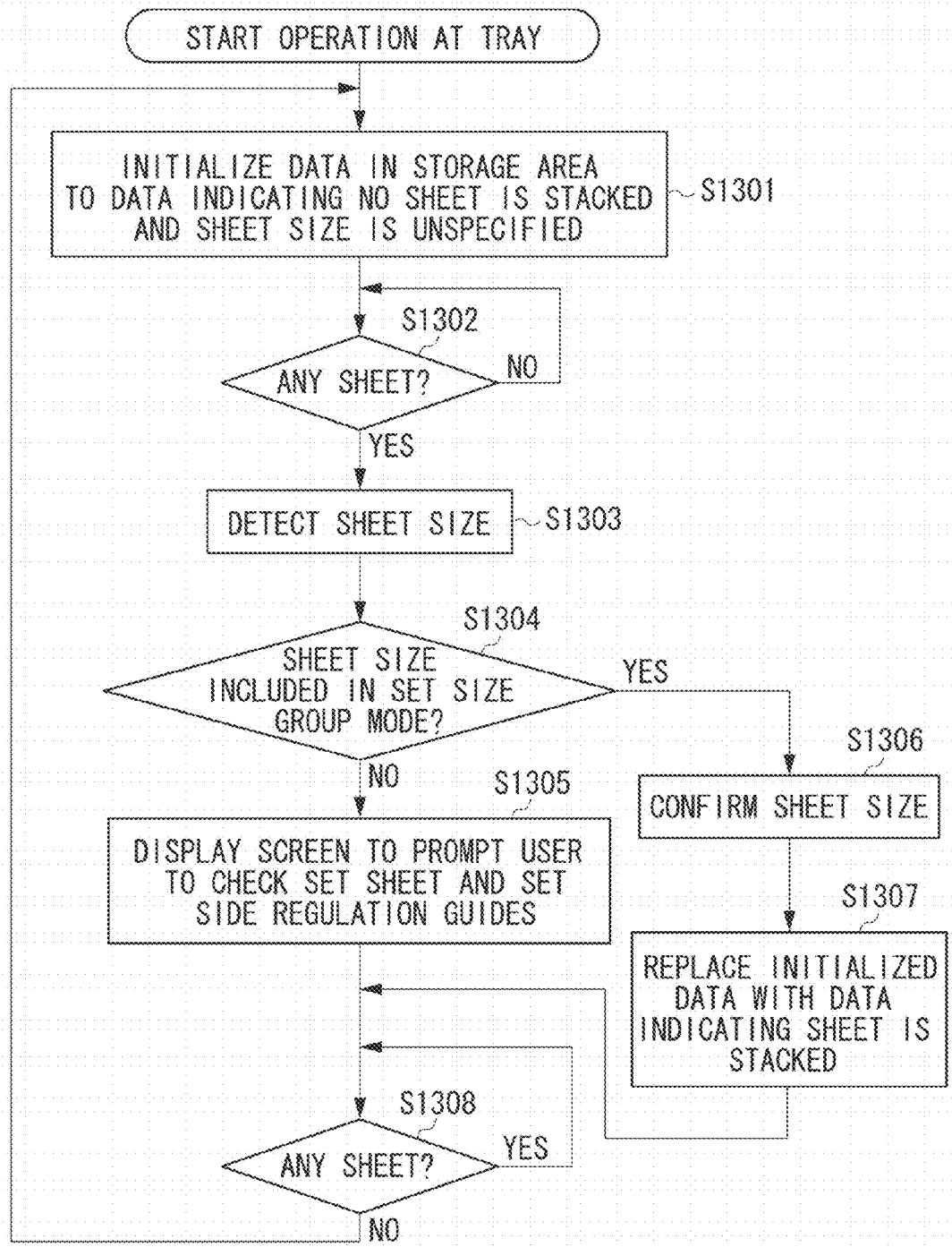

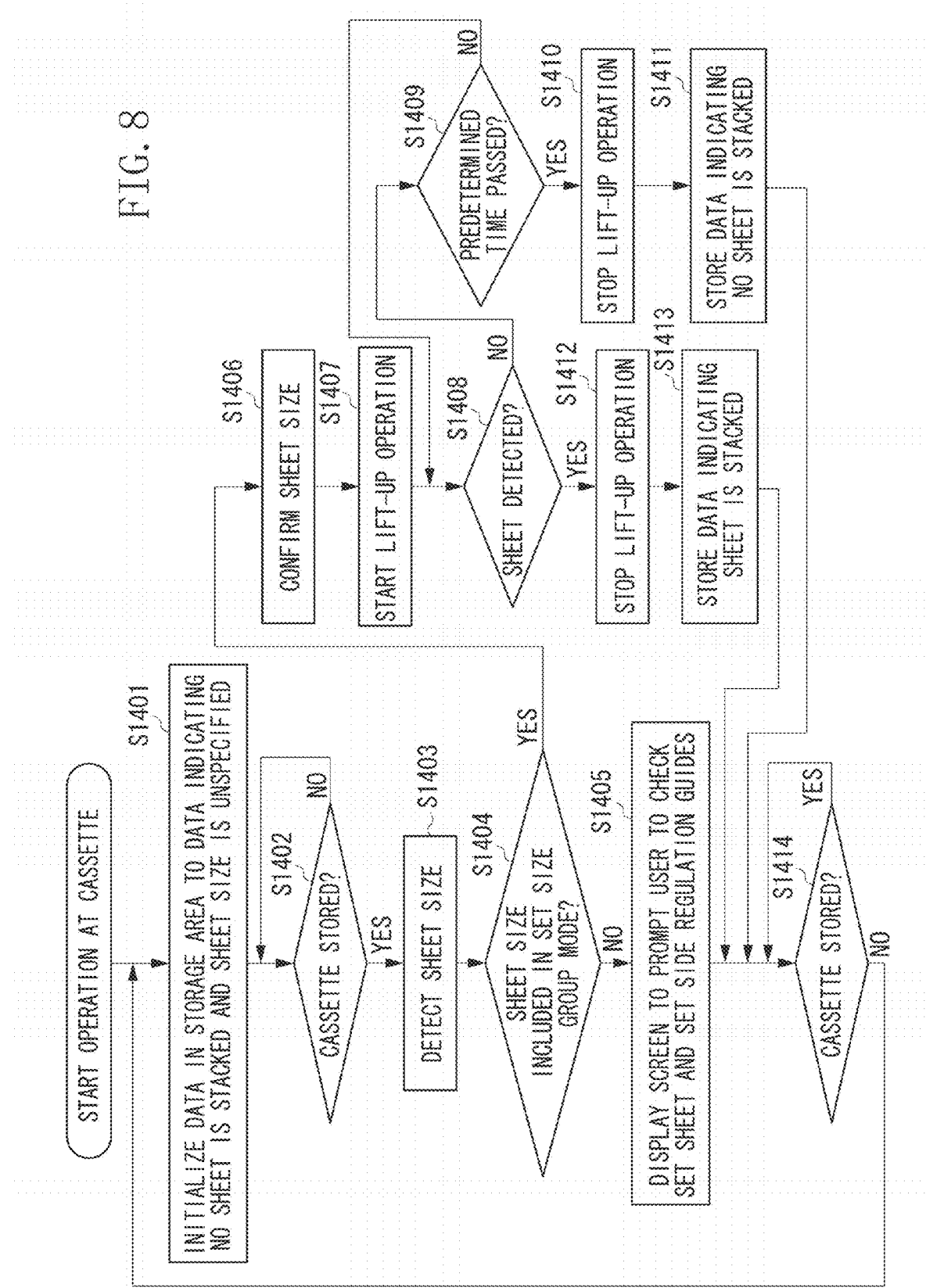

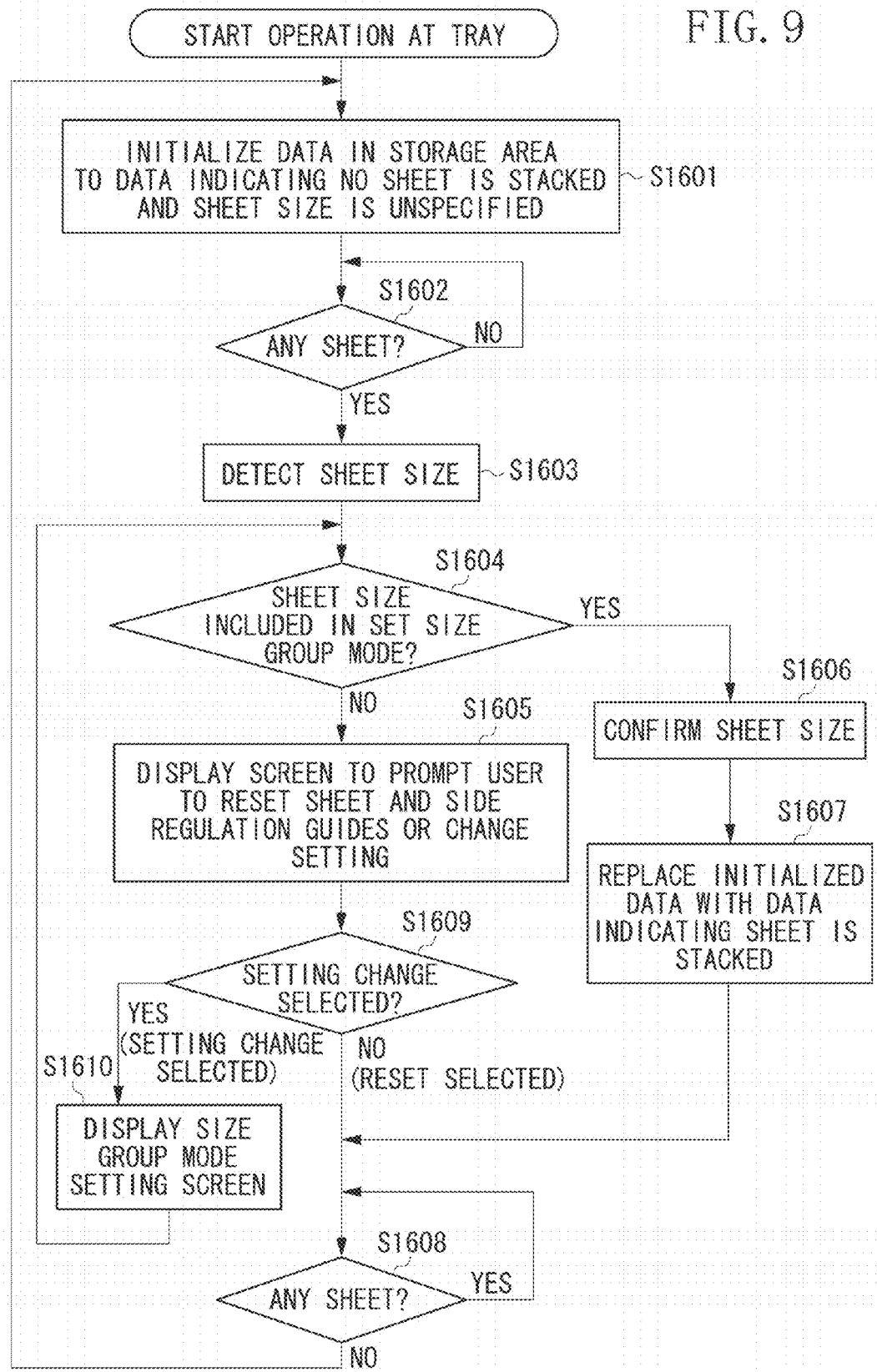

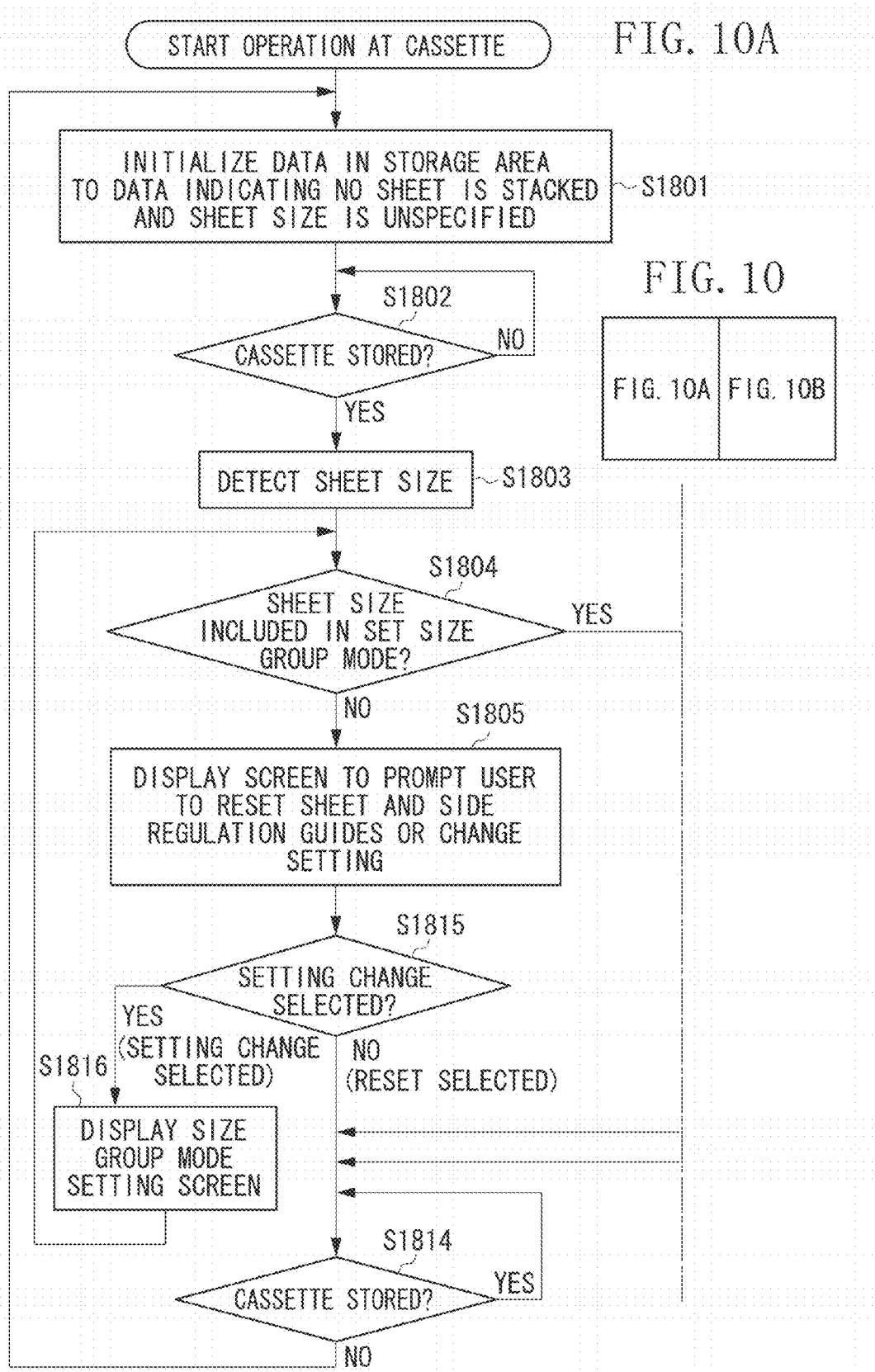

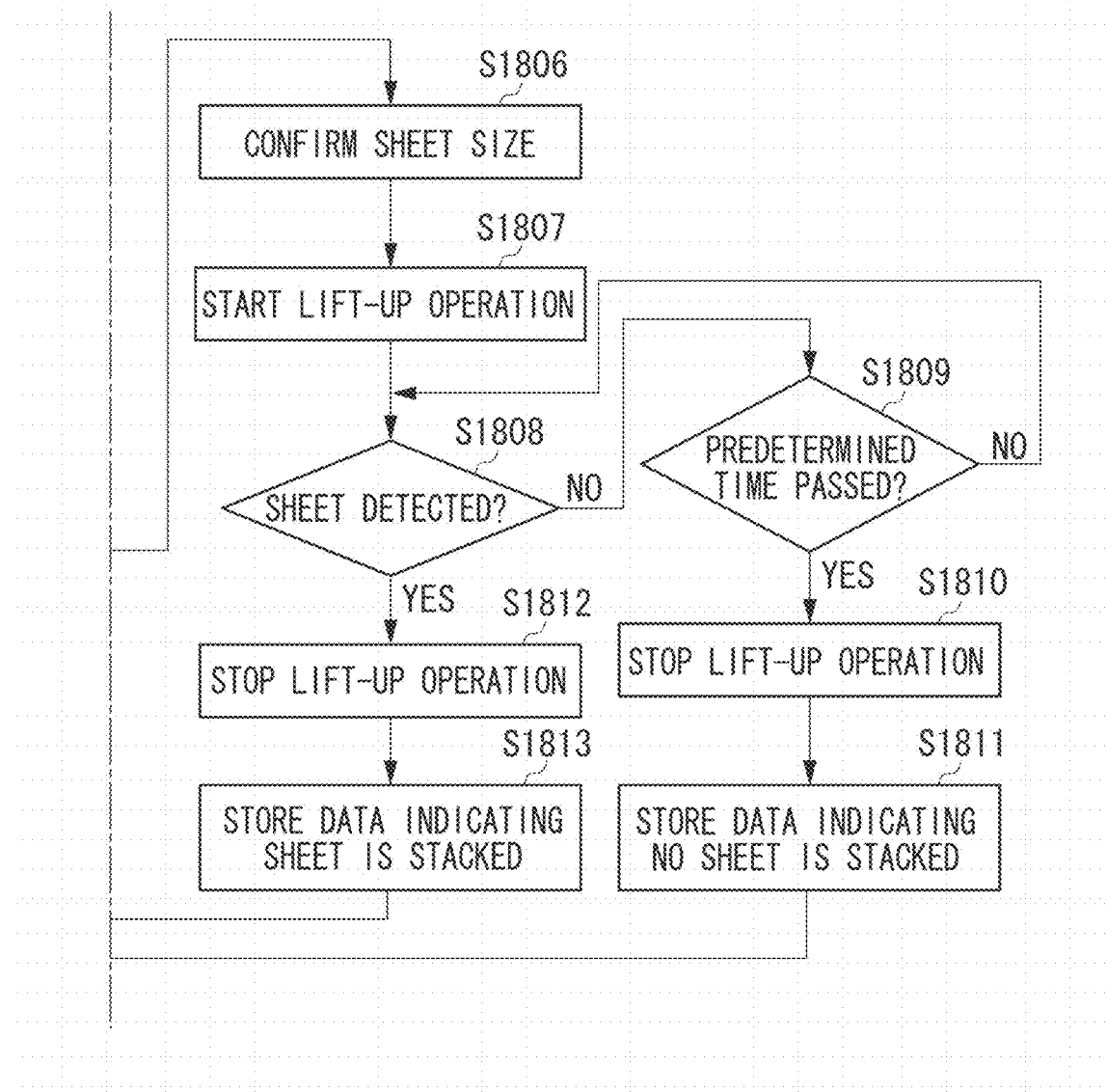

IMAGE FORMING APPARATUS

BACKGROUND OF THE INVENTION

1. Field of the Invention

The present invention relates to an image forming apparatus configured to detect the size of a sheet to be used to form an image.

2. Description of the Related Art

In general, an image forming apparatus such as a copy machine and a printer uses a wide variety of sheet sizes. Examples of sheet sizes include A series sizes (A3, A4, A5, etc.), B series sizes (B4, B5, etc.), inch series sizes (legal (LGL), letter (LTR), etc.). Sheets of various sizes are used depending on a user's operating environment. Thus, a sheet size detection mechanism is provided in a sheet stacking portion. For example, Japanese Patent Application Laid-Open No. 7-112844 discusses a configuration for automatically detecting the size of a sheet by detecting the position of a regulation plate, which is configured to regulate the position of the sheet, when the sheet is set in a sheet stacking portion.

In a case where a sheet size detection mechanism is provided in a sheet stacking portion, the following problem arises. Specifically, the sheet size may not be detected accurately due to a user's operational error (e.g., omission of the adjustment of the position of the regulation plate at the time of setting the sheet). If continuous printing is performed in a state where the sheet size is not accurately detected, continuous printing that is not intended by the user may be performed. For example, an image may not be formed in an appropriate position on the sheet. This wastes sheets and toner. To prevent such wasteful printing, the following configuration is discussed. Japanese Patent Application Laid-Open No. 9-249338 discusses a configuration in which while the first sheet is fed from a sheet stacking portion, the length of the sheet is measured, and the measured sheet size is compared with a sheet size detected based on the position of a regulation plate. If the sheet sizes do not match, the continuous printing is stopped.

However, the following problem arises in a conventional image forming apparatus, although the continuous printing is stopped in a case where the sheet size detected based on the position of the regulation plate of the sheet stacking portion in the image forming apparatus does not match the sheet size measured while the sheet is fed. Specifically, since the fed first sheet has already been conveyed on a conveyance path of the image forming apparatus, there may be a case where an image forming operation on a photosensitive member has already started, resulting in wasteful consumption of sheets and toner. Wasteful consumption of sheets and toner is more likely to occur especially in the following case. For example, a difference in sheet length between A4 size (210 mm) and LTR size (216 mm) is 6 mm. To recognize the difference in sheet length based on the position of the regulation plate of the sheet stacking portion, the regulation plate needs to be set accurately. Accordingly, when an A4-size sheet is set, if the sliding amount of the regulation plate is insufficient by 6 mm, that is to say, if the regulation plate is set in a position for LTR size, which is included in a different size series, the image forming apparatus detects that a LTR-size sheet is stacked. However, since the size of the sheet that is actually stacked is A4 size, the image forming apparatus detects that an A4-size sheet is fed. As a result, the sizes do not match, causing wasteful consumption of sheets and toner.

As the foregoing describes, the conventional image forming apparatus has the problem that in a case where the user erroneously sets the regulation plate in an incorrect position, sheets and toner are wastefully consumed.

SUMMARY OF THE INVENTION

The present invention is directed to an image forming apparatus configured to detect that a regulation plate of a sheet stacking portion is set in an incorrect position, so as to prevent wasteful image formation.

According to an aspect of the present invention, an image forming apparatus includes a stacking portion on which a sheet is to be stacked, an image forming unit configured to form an image on a sheet fed from the stacking portion, a size detection unit configured to detect a size of a sheet stacked on the stacking portion, a setting unit configured to set at least one sheet size to be allowed for use at the image forming apparatus, a notification unit configured to provide notification of information, and a control unit configured to cause the notification unit to provide a warning in a case where the size of the sheet detected by the size detection unit is not included in the at least one sheet size set by the setting unit.

Further features of the present invention will become apparent from the following description of exemplary embodiments with reference to the attached drawings.

BRIEF DESCRIPTION OF THE DRAWINGS

FIG. 3A is a top view illustrating a sheet tray according to the first and second exemplary embodiments. FIG. 3B illustrates a relationship between output values of a width volume sensor and sheet widths according to the first and second exemplary embodiments.

FIG. 6 is a flowchart illustrating a sheet size detection operation at a sheet tray according to the first exemplary embodiment.

FIG. 8 is a flowchart illustrating a sheet size detection operation at a cassette according to the first exemplary embodiment.

FIG. 9 is a flowchart illustrating a sheet size detection operation at a sheet tray according to the second exemplary embodiment.

FIG. 10, which consists of 10A and 10B, is a flowchart illustrating a sheet size detection operation at a cassette according to the second exemplary embodiment.

DESCRIPTION OF THE EMBODIMENTS

Various exemplary embodiments, features, and aspects of the invention will be described in detail below with reference to the drawings.

(Image Forming Apparatus)

Figure 1A:
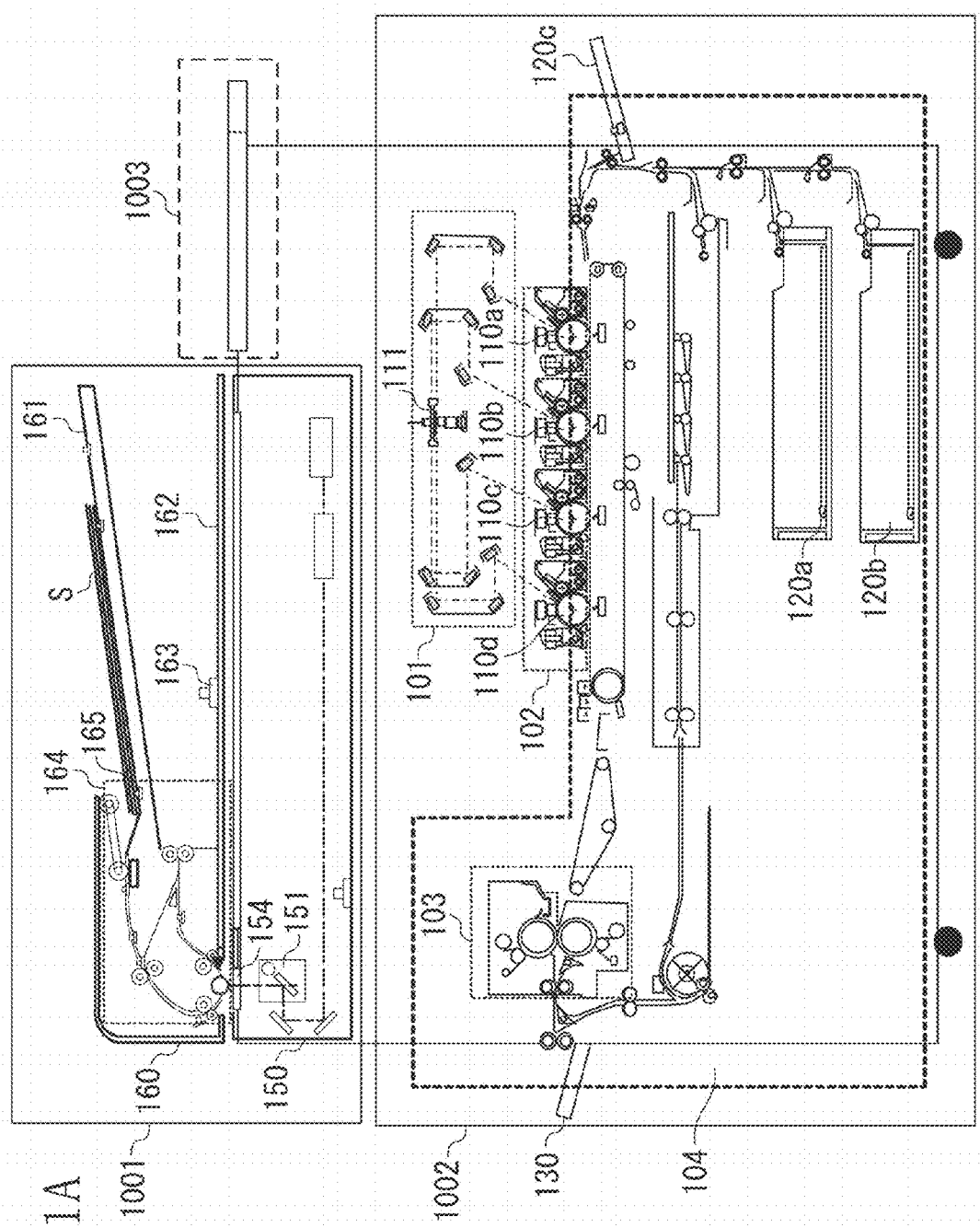
FIG. 1A is a cross sectional view illustrating an image forming apparatus according to first and second exemplary embodiments.

FIG. 1A is a longitudinal cross-sectional view illustrating a schematic configuration of an image forming apparatus according to a first exemplary embodiment. The image forming apparatus includes a reader unit 1001, a printer unit 1002, and an operation unit 1003. The reader unit 1001 includes an image reading device 150 and an automatic document feeder (hereinafter, "ADF") 160. The image reading device 150 illuminates a document to optically read an image of the document and converts the read image into an electric signal to generate image data.

Documents S stacked on a document tray 161 of the ADF 160 are conveyed one after another to a platen glass 154 by a conveyance unit 164 indicated by a dotted line in FIG. 1A. An optical scanner unit 151 is located under the platen glass 154 and reads an image of a document conveyed to the position of the platen glass 154. The document read by the optical scanner unit 151 is discharged onto a document discharge tray 162 by the conveyance unit 164. A discharged document detection sensor 163 detects whether a document is placed on the document discharge tray 162. Further, a document presence/absence detection sensor 165 detects whether the documents S are stacked on the document tray 161.

The printer unit 1002 includes a laser exposure unit 101 (dotted frame portion), an image forming unit 102, a fixing unit 103, and a sheet feed and conveyance unit 104 (dashed frame portion). The sheet feed and conveyance unit 104 includes cassettes 120a and 120b and a sheet tray 120c. The cassettes 120a and 120b and the sheet tray 120c are stacking portions for selectively stacking sheets of a plurality of sizes. The image forming unit 102 includes photosensitive drums 110a, 110b, 110c, and 110d (hereinafter, referred to as "photosensitive drums 110a to 110d"). The laser exposure unit 101 irradiates via a rotatable polygon mirror 111 the photosensitive drums 110a to 110d with light beams such as laser light modulated according to image data. The image forming unit 102 drives and rotates the photosensitive drums 110a to 110d, charges the photosensitive drums 110a to 110d using a charging device, develops, with toner, latent images formed on the photosensitive drums 110a to 110d by the laser exposure unit 101, and transfers the developed toner images onto a sheet. The four photosensitive drums 110a to 110d are provided to form images of yellow (Y), magenta (M), cyan (C), and black (K), respectively. The toner images of the respective colors are superimposed and transferred onto a sheet to form an unfixed full-color toner image. The fixing unit 103 includes a built-in heat source such as a halogen heater to fix the unfixed full-color toner image on the sheet with heat and pressure.

The sheet feed and conveyance unit 104 includes sheet storage units (details will be described below) such as the cassettes 120a and 120b and the sheet tray 120c. In response to an instruction from the operation unit 1003, the sheet feed and conveyance unit 104 separates sheets one by one from a plurality of sheets stored in any one of the sheet storage units, i.e., the cassettes 120a and 120b and the sheet tray 120c, and conveys the separated sheet to the image forming unit 102 and the fixing unit 103. As described above, on the sheet conveyed onto a conveyance path of the image forming apparatus, the toner images of the respective colors are transferred by the image forming unit 102 and fixed by the fixing unit 103, and then the sheet is discharged to the discharging tray 130.

Figure 1B:
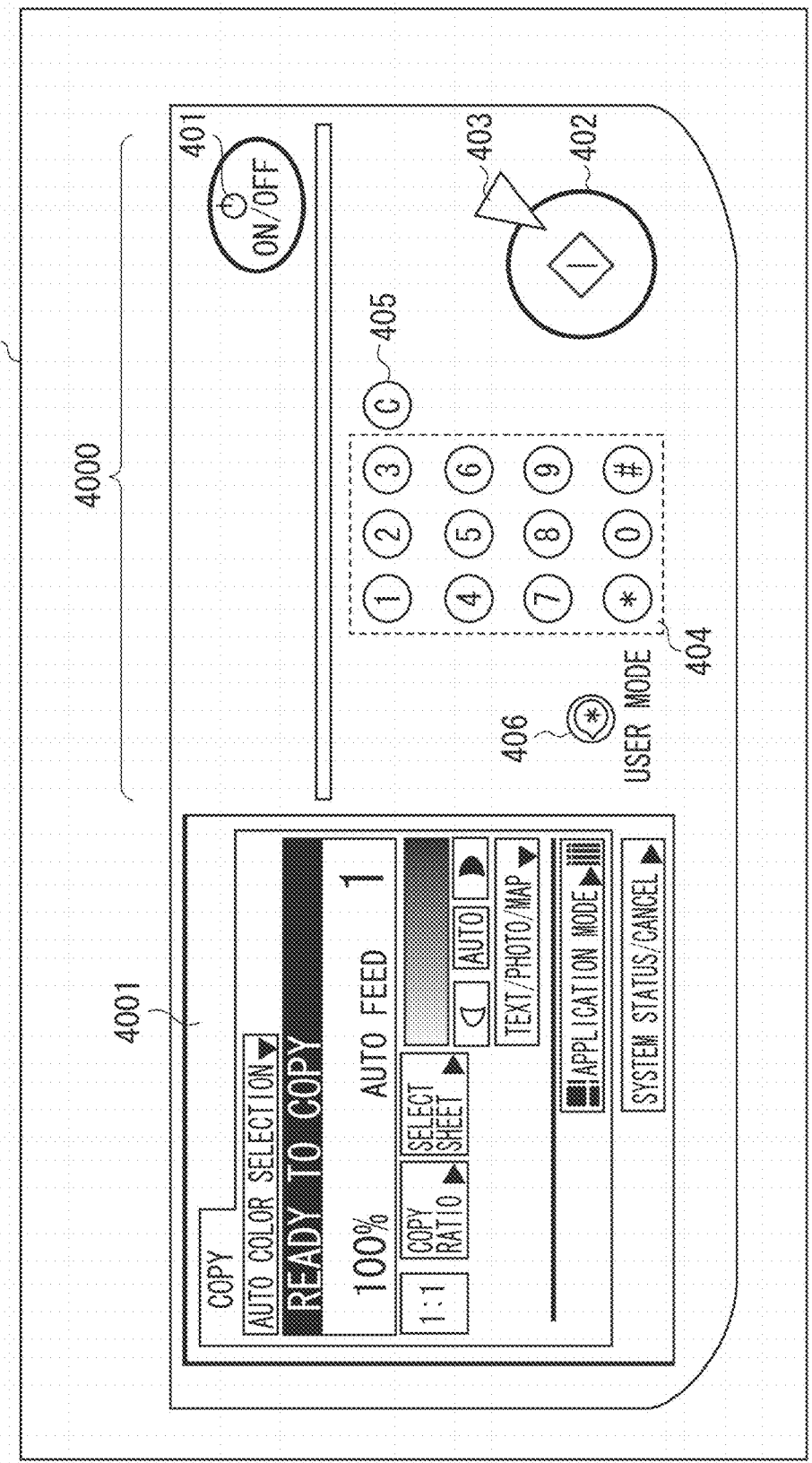
FIG. 1B schematically illustrates an operation unit according to the first and second exemplary embodiments.

The operation unit 1003 includes a key input unit 4000 and a touch panel unit 4001 as illustrated in FIG. 1B. The key input unit 4000 is operated by the user touching a key. A power switch 401 is a switch for switching on/off the supply of power to the entire image forming apparatus. A start key 402 is a key for giving an instruction to start a copy operation (document reading operation and print operation). A stop key 403 is a key for stopping a copy operation. A numeric keypad 404 (dashed frame portion) is a set of keys for setting the register number of copies, etc. A clear key 405 is a key for changing a mode from a copy mode back to a standard mode. A user mode key 406 is a key for moving to a user mode screen for system settings, various adjustments, etc. The touch panel unit 4001 can be operated by the user touching a touch panel 301 (see FIG. 2B). The touch panel unit 4001 also functions as a display unit and can display the state of the image forming apparatus. The touch panel unit 4001 normally displays the number of copies, the selected sheet size, the copy ratio, and the copy density.

(Control Block)

Figure 2A:
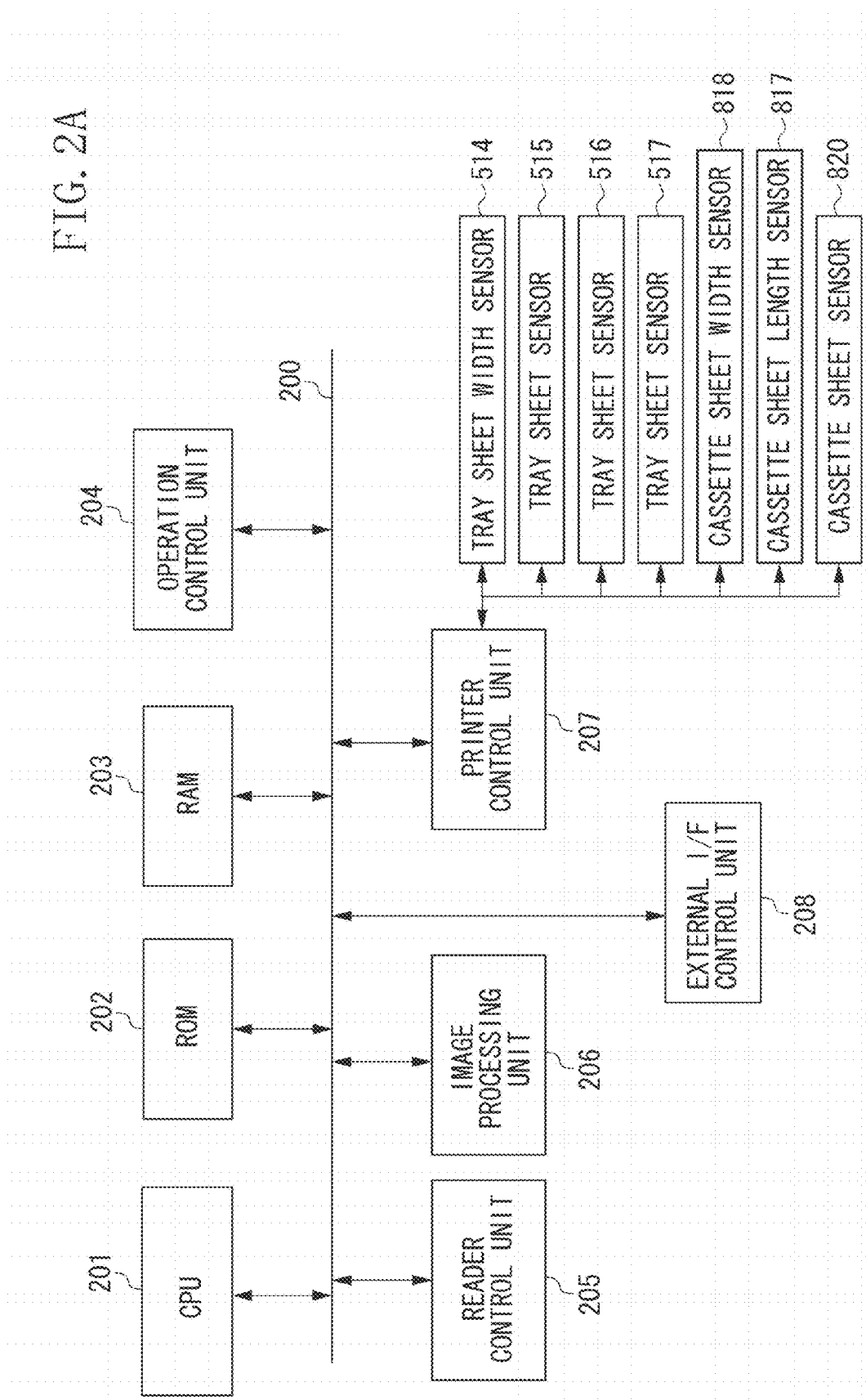
FIG. 2A is a control block diagram according to the first and second exemplary embodiments.

FIG. 2A is a control block diagram illustrating the image forming apparatus according to the present exemplary embodiment. A central processing unit (CPU) 201 performs the basic control of the image forming apparatus. A read-only memory (ROM) 202 and a random-access memory (RAM) 203 are connected to the CPU 201 via a system bus 200. A control program is written to the ROM 202. The RAM 203 is used as a storage area for a work space when the CPU 201 executes processing. The system bus 200 includes an address bus and a data bus. The ROM 202 stores, for example, a control procedure (described below). An operation control unit 204 is an electric circuit for controlling each component of the operation unit 1003. A reader control unit 205 is an electric circuit including an input/output port for controlling each component of the reader unit 1001. A printer control unit 207 is an electric circuit including an input/output port for controlling each component of the printer unit 1002. A printer control unit 207 controls a tray sheet width sensor 514, tray sheet sensors 515, 516, and 517, a cassette sheet width sensor 818, a cassette sheet length sensor 817, and a cassette sheet sensor 820, which will be described below. Further, the printer control unit 207 includes driving circuits for a pick-up roller 511 (see FIG. 3A) and a cassette pick-up roller 811 (see FIG. 4A). The CPU 201 controls the reader control unit 205 and the printer control unit 207 to execute an image formation operation according to contents of a control program stored in the ROM 202, based on settings that are set with the operation unit 1003 and provided from the operation control unit 204.

An image processing unit 206 performs various types of image processing on digital data that is obtained by the reader control unit 205 converting a document image, and outputs the image data to the printer control unit 207. An external interface (I/F) control unit 208 is an electric circuit for controlling communication with an external device such as a server or a personal computer (hereinafter, referred to as a PC) connected via a local area network (LAN) cable or a universal serial bus (USB) cable.

(Block Diagram of Operation Control Unit)

Figure 2B:
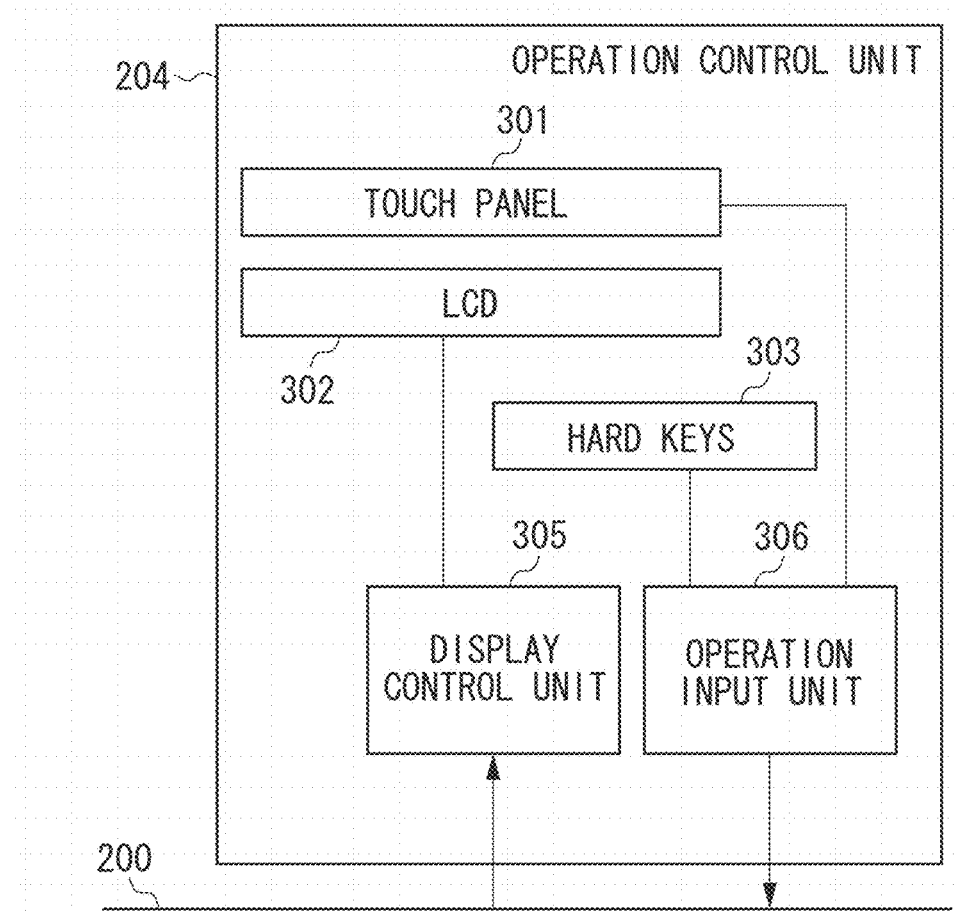
FIG. 2B is a block diagram illustrating an operation control unit according to the first and second exemplary embodiments.

FIG. 2B is a block diagram illustrating the operation control unit 204 in detail. A touch panel 301 and hard keys 303 (corresponding to 402 to 406 in FIG. 1B) are connected to the system bus 200 via an operation input unit 306. Coordinates information indicating a pressing position of the touch panel 301, and key information corresponding to a press on any of the hard keys 303 are output to the system bus 200 via the operation input unit 306. A liquid crystal display (LCD) 302 is connected to the system bus 200 via a display control unit 305. The display control unit 305 and the operation input unit 306 are connected to the CPU 201, the ROM 202, and the RAM 203 via the system bus 200. The ROM 202 stores, in addition to a control program, data on screens for setting various operation modes and data on display keys. The RAM 203 stores the current setting state of the image forming apparatus. The CPU 201 operates as follows in response to an input of coordinates information and key information from the operation input unit 306. More specifically, the CPU 201 selects a setting screen and a display key corresponding to the current setting state of the image forming apparatus and a user operation on the touch panel 301 or the hard keys 303, and transfers the selected setting screen and the selected display key as display data to the display control unit 305. The display control unit 305 sends to the LCD 302 the display data transferred from the CPU 201, and the LCD 302 visibly displays the transferred display data.

(Configuration of Sheet Tray)

The following describes the sheet tray 120c of the image forming apparatus in detail. FIG. 3A is a top view of the sheet tray 120c. A sheet is fed leftward in FIG. 3A by the pick-up roller 511. In other words, the sheet conveyance direction is the left direction in FIG. 3A. A plurality of sheets can be stacked on the sheet tray 120c, and the stacked sheets are conveyed one after another in the order from the uppermost sheet by the pick-up roller 511 toward the image forming unit 102. Side regulation guides 512 and 513 are configured to be slidable together along a width direction (direction indicated by arrows in FIG. 3A) that is orthogonal to the sheet conveyance direction. The side regulation guides 512 and 513 slide together in opposite directions to each other. If the user moves the side regulation guide 512 upward in FIG. 3A, the side regulation guide 513 moves downward in FIG. 3A. On the other hand, if the user moves the side regulation guide 512 downward in FIG. 3A, the side regulation guide 513 moves upward in FIG. 3A. The side regulation guides 512 and 513 hold both side end portions of the sheets stacked on the sheet tray 120c in the width direction to prevent skew feeding of the sheets.

Further, the side regulation guides 512 and 513 are connected to the tray sheet width sensor 514 via a link mechanism (not illustrated). The tray sheet width sensor 514 is configured to output to the CPU 201 an analog value corresponding to the positions of the side regulation guides 512 and 513. Based on a signal from the tray sheet width sensor 514, the CPU 201 detects the width of the sheets stacked on the sheet tray 120c. As used herein, the sheet width refers to the length of a sheet in the width direction. Further, the tray sheet sensors 515, 516, and 517 are flag sensors. The tray sheet sensor 515 is disposed at an end portion of the sheet tray 120c (on the side where the pick-up roller 511 is provided). The tray sheet sensor 516 is disposed at a distance of about 170 mm from the tray sheet sensor 515. The tray sheet sensor 517 is disposed at a distance of about 290 mm from the tray sheet sensor 515. The CPU 201 determines the presence or absence of a sheet with the tray sheet sensor 515. Further, the CPU 201 determines the length of a sheet with the tray sheet sensors 516 and 517. As used herein, the sheet length refers to the length of a sheet in the sheet conveyance direction. Details of a detection method will be described below.

(Sheet Size Detection at Sheet Tray)

The following describes a sheet size detection at the sheet tray 120c of the image forming apparatus. FIG. 3B illustrates the relationship between sheet widths and outputs of the tray sheet width sensor 514. FIG. 3B is a graph showing analog/digital (AD) values (in hexadecimal notation) along the horizontal axis, and sheet widths (mm) along the vertical axis. The AD values are obtained by converting signals output from the tray sheet width sensor 514 into digital signals. For example, the CPU 201 converts an analog value output from the tray sheet width sensor 514 into a 10-bit digital value (i.e., performs an AD conversion), and is capable of detecting a sheet width of up to about 330 mm at an AD value of 0x3FF. Since the image forming apparatus according to the present exemplary embodiment is not capable of printing on a sheet with a small width close to 0 mm, the CPU 201 is not configured to detect a sheet width of 0 mm at an AD value close to 0x000. FIG. 3B illustrates an example in which the sheet widths are an A3 size width (297 mm) (indicated as "A3 WIDTH" in FIG. 3B), an A4R sheet width (210 mm) (indicated as "A4R WIDTH" in FIG. 3B), and an A5R sheet width (148 mm) (indicated as "A5R WIDTH" in FIG. 3B) at AD values of 0x358, 0x203, and 0x111, respectively.

Table 1 is a data table showing the relationship among detection results by the tray sheet sensors 515 to 517, detection results by the tray sheet width sensor 514, and sheet sizes. Table 1 is used to determine the size of the sheets stacked on the sheet tray 120c. The data shown in Table 1 is stored in the RAM 203 or the ROM 202 each of which is a size data storage unit.

TABLE 1

| | | | | Length detection | | | Width |
| --- | --- | --- | --- | --- | --- | --- | --- |
| | Size | Sheet length mm | Sheet width mm | Sensor 1 515 | Sensor 2 516 | Sensor 3 517 | detection Width volume sensor 514 |
| A series | A3 | 420 | 297 | ON | ON | ON | 0x358 ± 0x10 |
| | A4 | 210 | 297 | ON | ON | OFF | 0x358 ± 0x10 |
| | A4R | 297 | 210 | ON | ON | ON | 0x203 ± 0x10 |
| | A5R | 210 | 148 | ON | OFF | OFF | 0x111 ± 0x10 |
| B series | B4 | 364 | 257 | ON | ON | ON | 0x2BB ± 0x10 |
| | B5 | 182 | 257 | ON | ON | OFF | 0x2BB ± 0x10 |
| | B5R | 257 | 182 | ON | ON | OFF | 0x196 ± 0x10 |
| Inch series | 12 × 18 | 457.2 | 304.8 | ON | ON | ON | 0x376 ± 0x10 |
| | 11 × 17 | 431.8 | 279.4 | ON | ON | ON | 0x313 ± 0x10 |
| | LTR | 215.9 | 279.4 | ON | ON | OFF | 0x313 ± 0x10 |
| | EXEC | 184.1 | 266.7 | ON | ON | OFF | 0x2E1 ± 0x10 |
| | LGL | 355.6 | 215.9 | ON | ON | ON | 0x21A ± 0x10 |
| | LTRR | 279.4 | 215.9 | ON | ON | OFF | 0x21A ± 0x10 |
| K series | 8K | 390 | 270 | ON | ON | ON | 0x2EE ± 0x10 |
| | 16K | 195 | 270 | ON | ON | OFF | 0x2EE ± 0x10 |

In Table 1, the first, second, third, and fourth columns show the sheet type (A series, B series, etc.), the sheet size (A3, A4, etc.), the sheet length (mm) of each sheet, and the sheet width (mm) of each sheet, respectively. Further, the fifth to seventh columns in Table 1 show detection states (on/off) of the tray sheet sensors 515 to 517 (referred to as "sensors 1 to 3" respectively), and the eighth column shows outputs (AD values) of the tray sheet width sensor 514.

The CPU 201 acquires the sheet width with the tray sheet width sensor 514 and the sheet length with the tray sheet sensors 516 and 517, and determines the sheet size by referring to Table 1. For example, in a case where the tray sheet sensors 516 and 517 are "ON" and the AD value of the tray sheet width sensor 514 is "0x358±0x10", the CPU 201 determines that the sheet size is A3 size. Further, for example, in a case where the tray sheet sensor 516 is "ON", the tray sheet sensor 517 is "OFF", and the AD value of the tray sheet width sensor 514 is "0x358±0x10", the CPU 201 determines that the sheet size is A4 size. Further, in a case where the tray sheet sensors 516 and 517 are "ON" and the AD value of the tray sheet width sensor 514 is "0x203±0x10", the CPU 201 determines that the sheet size is A4R size.

As shown in Table 1, for example, even if the combination of ON and OFF of the tray sheet sensors 516 and 517 is the same as in the cases of A3 and A4R sizes, the sheet size can be determined based on the output value of the tray sheet width sensor 514. Further, even if the output value of the tray sheet width sensor 514 is the same as in the cases of A3 and A4 sizes, the sheet size can be determined based on the combination of ON and OFF of the tray sheet sensors 516 and 517. In the present exemplary embodiment, the CPU 201 determines the sheet size only in a case where the tray sheet sensor 515 is ON, that is to say, only in a case where a sheet is determined to be stacked on the sheet tray 120c. On the other hand, the CPU 201 does not determine the sheet size in a case where the tray sheet sensor 515 is OFF, that is to say, in a case where no sheet is stacked on the sheet tray 120c.

(Configuration of Cassette)

Figure 4A:
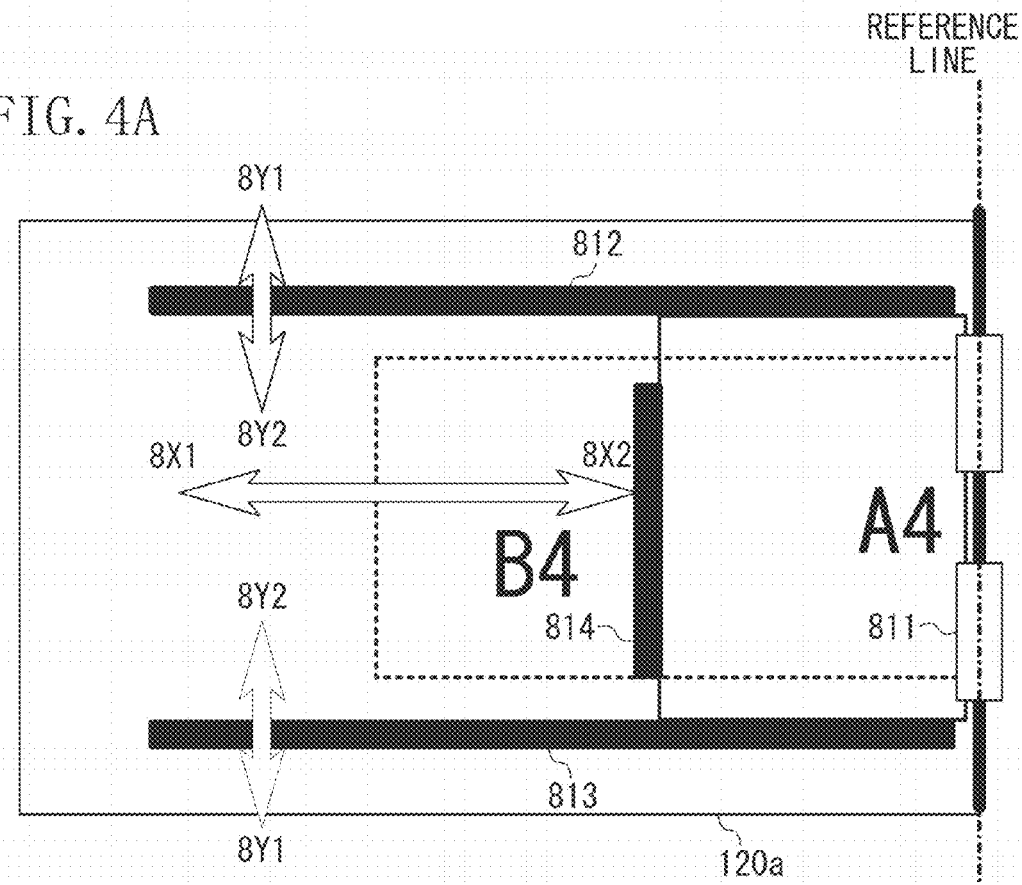
FIGS. 4A, 4B and 4C are schematic diagrams illustrating a cassette unit according to the first and second exemplary embodiments.
Figure 4B:
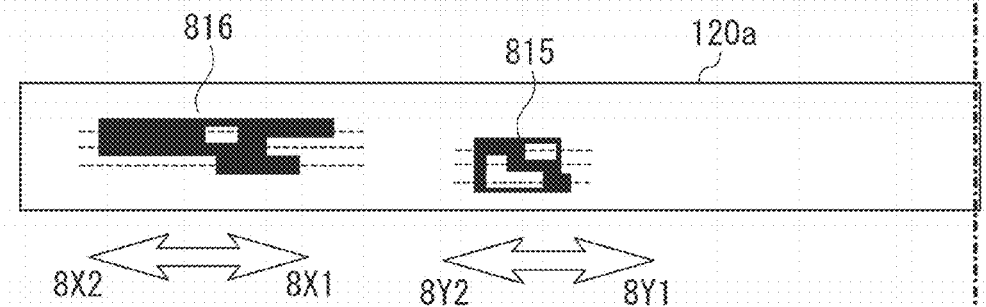
Figure 4C:
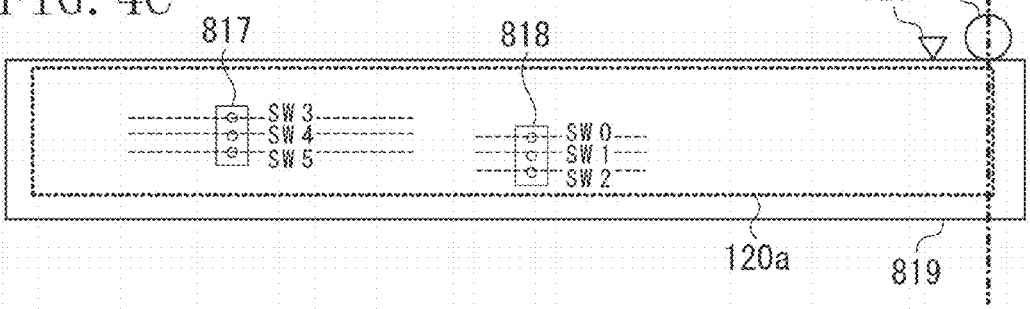

The following describes the cassette 120a of the image forming apparatus in detail. FIGS. 4A, 4B, and 4C are schematic diagrams illustrating the cassette 120a. FIG. 4A is a top view of the cassette 120a. FIG. 4B is a virtual transparent rear side view of the cassette 120a viewed from the front of the image forming apparatus. FIG. 4C illustrates the image forming apparatus side that faces the rear side of the cassette 120a. In FIG. 4C, the cassette 120a is indicated by a dotted line.

When the cassette 120a is pulled out from a storage portion 819 of the image forming apparatus, sheets can be replenished. When the cassette 120a is stored in the storage portion 819, a printing operation can be performed.

A plurality of sheets can be stacked in the cassette 120a. The sheets stacked therein are fed one after another in the order from the uppermost sheet by the cassette pick-up roller 811 provided near the storage portion 819. Side regulation guides 812 and 813 are configured to be slidable together in the directions of arrows 8Y1 and 8Y2. The side regulation guides 812 and 813 hold both side end portions of the stacked sheets in the width direction to prevent skew feeding of the sheets. The side regulation guides 812 and 813 slide together as in the case of the sheet tray 120c, and the description thereof is thus omitted.

Further, the cassette side regulation guides 812 and 813 are connected to the cassette sheet width detection plate 815 via a link mechanism (not illustrated). The cassette sheet width detection plate 815 slides together with the cassette side regulation guides 812 and 813 in the directions of the arrows 8Y1 and 8Y2 according to the positions of the cassette side regulation guides 812 and 813. Further, a cassette rear end regulation guide 814 is configured to be slidable in the directions of arrows 8X1 and 8X2 to prevent a sheet from moving toward a direction opposite to the sheet feeding direction in reaction to the feeding of the stacked sheets. Further, the cassette rear end regulation guide 814 is connected to a cassette sheet length detection plate 816 via a link mechanism (not illustrated), and the cassette sheet length detection plate 816 slides together with the cassette rear end regulation guide 814 in the directions of the arrows 8X1 and 8X2 according to the position of the cassette rear end regulation guide 814.

The cassette sheet width sensor 818 provided in the storage portion 819 includes triple switches SW0, SW1, and SW2. With the cassette 120a stored in the storage portion 819, the cassette sheet width sensor 818 detects sheet width information. More specifically, the cassette sheet width sensor 818 detects information on the position of the cassette sheet width detection plate 815, which slides together with the cassette side regulation guides 812 and 813 in the directions of the arrows 8Y1 and 8Y2, as a combination of on/off of the switches SW0, SW1, and SW2. Details thereof will be described below with reference to Table 2.

Similarly, the cassette sheet length sensor 817 provided in the storage portion 819 includes triple switches SW3, SW4, and SW5. With the cassette 120a stored in the storage portion 819, the cassette sheet length sensor 817 detects sheet length information. More specifically, the cassette sheet length sensor 817 detects, as a combination of on/off of the switches SW3, SW4, and SW5, shape information of the position of the cassette sheet length detection plate 816, which slides together with the cassette rear end regulation guide 814 in the directions of the arrows 8X1 and 8X2. Details thereof will be described below with reference to Table 2.

Further, the cassette sheet sensor 820 provided in the storage portion 819 detects a surface of the uppermost sheet among the plurality of sheets stacked in the cassette 120a. The CPU 201 drives or stops a lift-up motor (not illustrated) according to results of detection by the cassette sheet width sensor 818, the cassette sheet length sensor 817, and the cassette sheet sensor 820, whereby a lift-up operation is performed to lift up the sheets stacked in the cassette 120a to the height at which the sheets can be fed by the cassette pick-up roller 811. Further, with the sheets lifted up to the height at which the sheets can be fed, the CPU 201 performs an operation to determine the presence or absence of a sheet in the cassette 120a.

(Sheet Size Detection at Cassette)

The following describes the sheet size detection at the cassette 120a of the image forming apparatus according to the present exemplary embodiment. Table 2 is a data table showing the relationship among results of detection by the cassette sheet length sensor 817 (SW3 to SW5), results of detection by the cassette sheet width sensor 818 (SW0 to SW2), and sheet sizes. Table 2 is used to determine the sheet size at the cassette 120a. The data shown in Table 2 is stored in the RAM 203 or the ROM 202.

TABLE 2

|  |  | Sheet | Sheet | Length detection | | | Width detection | | |
|---|---|---|---|---|---|---|---|---|---|
|  | Size | length mm | width mm | SW3 | SW4 | SW5 | SW0 | SW1 | SW2 |
| A series | A3 | 420 | 297 | ON | ON | OFF | OFF | OFF | ON |
|  | A4 | 210 | 297 | ON | ON | ON | OFF | OFF | ON |
|  | A4R | 297 | 210 | OFF | ON | ON | ON | ON | OFF |
|  | A5R | 210 | 148 | ON | ON | ON | ON | OFF | OFF |

TABLE 2-continued

|  | Size | Sheet length mm | Sheet width mm | Length detection | | | Width detection | | |
|---|---|---|---|---|---|---|---|---|---|
|  |  |  |  | SW3 | SW4 | SW5 | SW0 | SW1 | SW2 |
| B series | B4 | 364 | 257 | OFF | ON | OFF | OFF | ON | OFF |
|  | B5 | 182 | 257 | ON | OFF | OFF | OFF | ON | OFF |
|  | B5R | 257 | 182 | ON | OFF | ON | ON | OFF | OFF |
| Inch series | 12 × 18 | 457.2 | 304.8 | OFF | OFF | OFF | OFF | OFF | ON |
|  | 11 × 17 | 431.8 | 279.4 | OFF | OFF | OFF | ON | ON | ON |
|  | LTR | 215.9 | 279.4 | ON | ON | ON | ON | ON | ON |
|  | EXEC | 184.1 | 266.7 | ON | OFF | OFF | OFF | ON | ON |
|  | LGL | 355.6 | 215.9 | OFF | ON | OFF | ON | ON | OFF |
|  | LTRR | 279.4 | 215.9 | OFF | OFF | ON | ON | ON | OFF |
| K series | 8K | 390 | 270 | ON | ON | OFF | OFF | ON | ON |
|  | 16K | 195 | 270 | ON | ON | ON | OFF | ON | ON |

In Table 2, the first, second, third, and fourth columns show the sheet type (A series, B series, etc.), the sheet size (A3, A4, etc.), the sheet length (mm) of each sheet, and the sheet width (mm) of each sheet, respectively. Further, the fifth to seventh columns in Table 2 shows outputs (on/off) of the switches SW3 to SW5 of the cassette sheet length sensor 817, respectively, and the eighth to tenth columns show outputs of the switches SW0 to SW2 of the cassette sheet width sensor 818, respectively. As described above, the CPU 201 detects the position of the cassette sheet width detection plate 815 with the switches SW0, SW1, and SW2 of the cassette sheet width sensor 818 to acquire sheet width information. Further, the CPU 201 detects the position of the cassette sheet length detection plate 816 with the switches SW3, SW4, and SW5 of the cassette sheet length sensor 817 to acquire sheet length information. The CPU 201 determines the size of the sheets stacked in the cassette 120a by referring to the sheet width information, the sheet length information, and Table 2.

For example, suppose that outputs of the switches SW3, SW4, and SW5 of the cassette sheet length sensor 817 and outputs of the switches SW0, SW1, and SW2 of the cassette sheet width sensor 818 are "ON", "ON", "OFF", "OFF", "OFF", and "ON", respectively. In this case, the CPU 201 determines that the size of the sheets stacked in the cassette 120a is A3 size. As the foregoing describes, the CPU 201 can determine the size of the sheets stacked in the cassette 120a by referring to a combination result of on/off of the switches SW0 to SW5 and Table 2. In other words, the side regulation guides 812 and 813 and the cassette sheet width detection plate 815 are linked together and the position of the cassette sheet width detection plate 815 is determined so that the combination results of the switches SW0 to SW5 for the respective sheet sizes are not the same in Table 2. The cassette rear end regulation guide 814 and the cassette sheet length detection plate 816 are linked together and the position of the cassette sheet length detection plate 816 is determined in a similar way to the above.

In the present exemplary embodiment, the switches SW0, SW1, and SW2 of the cassette sheet width sensor 818 and the switches SW3, SW4, and SW5 of the cassette sheet length sensor 817 are used to detect whether the cassette 120a is stored in the storage portion 819. More specifically, in a case where all the switches SW0 to SW5 are OFF, the CPU 201 determines that the cassette 120a is not stored in the storage portion 819. On the other hand, in a case where any one of the switches SW0 to SW5 is ON, the CPU 201 determines that the cassette 120a is stored in the storage portion 819. The configuration of the cassette 120b is similar to the configuration of the cassette 120a, and the description thereof is thus omitted.

(Size Group Mode)

According to the present exemplary embodiment, after sheets are stacked in the respective sheet feeding units, the sheet sizes are automatically determined. In the sheet size determination, the type of a sheet size detected as a standard size varies depending on a size group mode setting. Details are as follows. First, the size group mode will be described. The size group refers to a group of each series of a standard size. For example, each of A series, B series, inch series, and K series is a size group. The size group mode is a function to set, for each size group, whether to accept the size detected at each of the sheet feeding units as a standard size. The size group mode setting is an operation to set a sheet size to be allowed for use at the image forming apparatus, and is different from an operation to designate a sheet size to be used in each image formation job. The size group mode setting is stored in the nonvolatile RAM 203.

Table 3 is a data table showing the relationship between results of sheet size detection at the sheet feeding units, and the size group modes. The data shown in Table 3 is stored in the RAM 203 or the ROM 202.

TABLE 3

|  | Sheet Size | Sheet length mm | Sheet width mm | Size group mode | | | |
|---|---|---|---|---|---|---|---|
|  |  |  |  | [1] All sizes | [2] A/B sizes | [3] Inch sizes | [4] A/K sizes |
| A series | A3 | 420 | 297 | A3 | A3 | N/A | A3 |
|  | A4 | 210 | 297 | A4 | A4 | N/A | A4 |
|  | A4R | 297 | 210 | A4R | A4R | N/A | A4R |
|  | A5R | 210 | 148 | A5R | A5R | N/A | A5R |
| B series | B4 | 364 | 257 | B4 | B4 | N/A | N/A |
|  | B5 | 182 | 257 | B5 | B5 | N/A | N/A |
|  | B5R | 257 | 182 | B5R | B5R | N/A | N/A |
| Inch series | 12 × 18 | 457.2 | 304.8 | 12 × 18 | N/A | 12 × 18 | N/A |
|  | 11 × 17 | 431.8 | 279.4 | 11 × 17 | N/A | 11 × 17 | N/A |
|  | LTR | 215.9 | 279.4 | LTR | N/A | LTR | N/A |
|  | EXEC | 184.1 | 266.7 | EXEC | N/A | EXEC | N/A |
|  | LGL | 355.6 | 215.9 | LGL | N/A | LGL | N/A |
|  | LTRR | 279.4 | 215.9 | LTRR | N/A | LTRR | N/A |
| K series | 8K | 390 | 270 | 8K | N/A | N/A | 8K |
|  | 16K | 195 | 270 | 16K | N/A | N/A | 16K |

The size group mode is set to include at least one of the plurality of size groups. In the image forming apparatus according to the present exemplary embodiment, any of four modes, an all sizes mode, an A/B sizes mode, an inch sizes mode, and an A/K sizes mode can be set as the size group mode. The all sizes mode is a mode in which any sheet size among all the size series specified in the column "All sizes" in Table 3, that is, A series, B series, inch series, and K series is accepted as a result of detection at each of the sheet feeding units. The A/B sizes mode is a mode in which only when the size detected at each of the sheet feeding units is any one of A3, A4, A4R, and A5R of A series and B4, B5, and B5R of B series among all the sheet sizes, the detection result is accepted as the sheet size. In other words, the A/B sizes mode is a mode in which even if the sheet feeding units detect a sheet size of the inch series or the K series, the detection result is not accepted as the sheet size.

The inch sizes mode is a mode in which only when the size detected at each of the sheet feeding units is any one of 12×18, 11×17, LTR, EXEC, LGL, and LTRR of the inch series among all the sheet sizes, the detection result is accepted as the sheet size. In other words, the inch sizes mode is a mode in which even if the sheet feeding units detect any one of the sheet sizes of A series, B series, and K series, the detection result is not accepted as the sheet size. In the A/K sizes mode is a mode in which only when the size detected at each of the sheet feeding units is any one of A3, A4, A4R, and A5R of the A series and 8K and 16K of the K series among all the sheet sizes, the detection result is accepted as the sheet size. In other words, the A/K sizes mode is a mode in which even if the sheet feeding units detect a sheet size of the B series or the inch series, the detection result is not accepted as the sheet size. In Table 3, "N/A" in a cell indicates a sheet size of the size series that is not accepted as a result of detection at each of the sheet feeding units. Further, in the image forming apparatus according to the present exemplary embodiment, the setting of the four modes described above is provided, considering the regions in which the image forming apparatus is used and the trends in sheet size series relatively frequently used in each of the regions. The sheet sizes to be included in each size group may be determined for each image forming apparatus.

Table 4 is a data table showing the relationship between information on the regions in which the image forming apparatus is used (hereinafter, referred to as "region information") and the size group modes preset in the image forming apparatus. The data shown in Table 4 is stored in the RAM 203 or the ROM 202, each of which is a regional information storage unit.

TABLE 4

| Region information | Size group mode to be preset |
| --- | --- |
| North America | Inch sizes mode |
| China | A/K sizes mode |
| Japan | A/B sizes mode |
| Europe | A/B sizes mode |
| Other regions | A/B sizes mode |

In the image forming apparatus according to the present exemplary embodiment, the region information is stored in the nonvolatile RAM 203 at a factory so as to determine a language to be displayed on the operation unit 1003 according to the destination of the image forming apparatus. For example, one of the five regions, the North America region, China region, Japan region, Europe region, and other regions is stored as the region information in the RAM 203. In the image forming apparatus according to the present exemplary embodiment, a size group mode is preset at a factory as indicated in Table 4 based on the region information stored in the RAM 203. As shown in Table 4, the size group mode of the image forming apparatus for the North America region is preset to the inch sizes mode, because the inch series sheet sizes are more likely to be used in the North America region whereas the sheet sizes of the A, B, and K series are less likely to be used there. Further, the size group mode of the image forming apparatuses for the China region is preset to the A/K sizes mode, because the sheet sizes of the A and K series are more likely to be used in the China region whereas the sheet sizes of the B series and the inch series are less likely to be used there. The size group mode of the image forming apparatus for the Japan region, the Europe region, or other regions is preset to the A/B sizes mode, because the sheet sizes of the A and B series are more likely to be used in the Japan region, the Europe region, and other regions whereas the sheet sizes of the inch-based series and the K series are less likely to be used there. While the size group mode of the image forming apparatus according to the present exemplary embodiment is preset based on the region information stored in the RAM 203 and the data shown in Table 4, the image forming apparatus also has a function to allow the user to arbitrarily change the preset size group mode.

(Size Group Mode Setting Change)

Figure 5A:
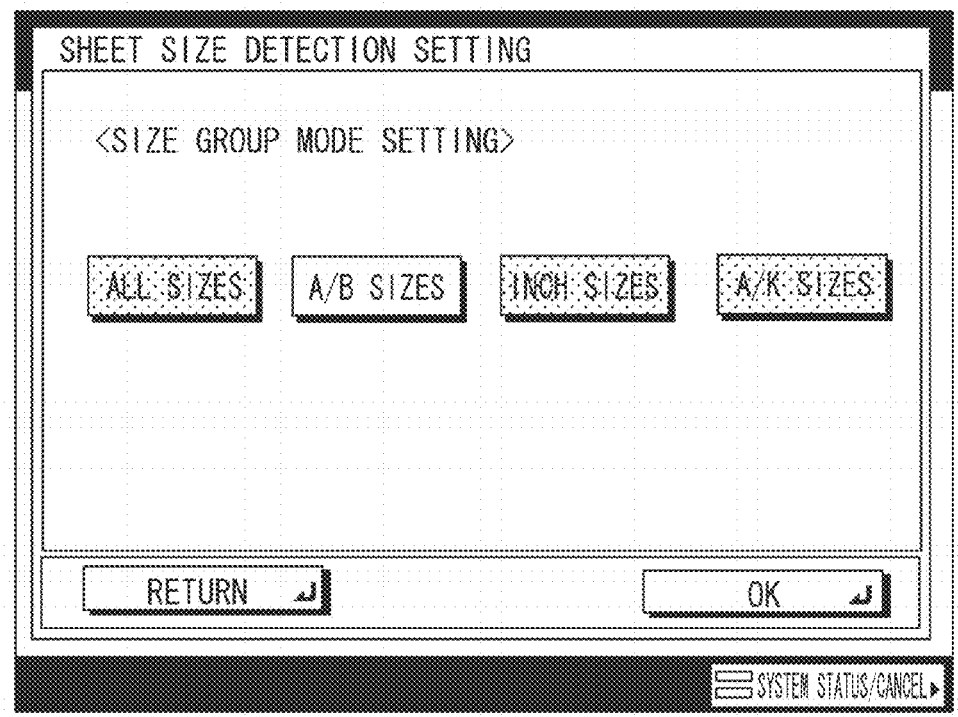
FIGS. 5A and 5B each illustrate a size group mode setting screen according to the first and second exemplary embodiments.

FIG. 5A illustrates a size group mode setting screen displayed on the operation unit 1003. The user can arbitrarily change the preset size group mode on the setting screen illustrated in FIG. 5A. For example, the size group mode of the image forming apparatus shipped from a factory for the Japan region is preset to the A/B sizes mode as shown in Table 4. Thus, when a sheet of the inch series such as LTR is set in the cassette, for example, a result of sheet size detection at the sheet feeding unit is not accepted as indicated in the column "[2] A/B sizes" in Table 3. However, in a case where only sheets of the inch series are used, the user changes the size group mode setting to the inch sizes mode ("[3] Inch sizes" in Table 3) on the setting screen illustrated in FIG. 5A. The setting is changed as described above, so that a sheet size of the inch series is accepted as a result of size detection at each of the sheet feeding units. Further, in a case where the user uses a sheet of the A, B, and inch series, the user can change the size group mode to the all sizes mode ("[1] All sizes" in Table 3) on the setting screen illustrated in FIG. 5A. As a result, a sheet size of the A, B, and inch series is accepted as a result of the detection at the sheet feeding units.

Figure 5B:
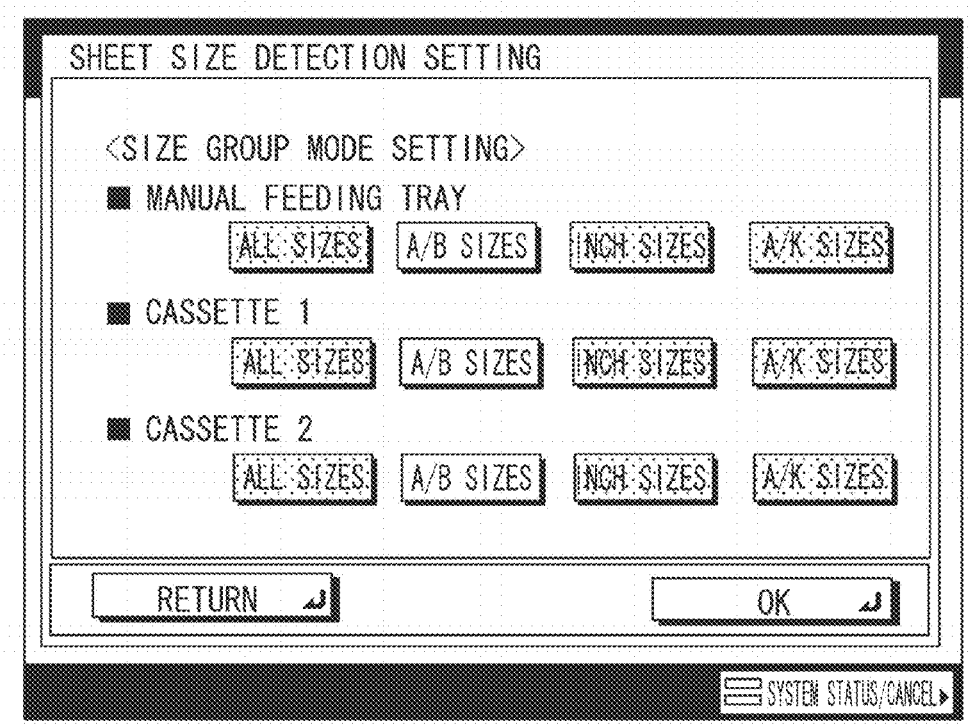

In the image forming apparatus according to the present exemplary embodiment, the size group modes of the sheet tray 120c and the cassettes 120a and 120b are collectively set. However, the size group mode may be set for each sheet storage unit as illustrated in FIG. 5B. In FIG. 5B, "MANUAL FEEDING TRAY" corresponds to the sheet tray 120c, and "CASSETTE 1" and "CASSETTE 2" correspond to the cassettes 120a and 120b, respectively.

(Sheet Size Detection Processing at Sheet Tray)

FIG. 6 is a flowchart illustrating the sheet size detection processing at the sheet tray 120c. The processing illustrated in the flowchart is executed by the CPU 201. In step S1301, after the power supply is turned on, the CPU 201 initializes data in a storage area of the RAM 203, which stores results of detection at the sheet tray 120c of the image forming apparatus according to the present exemplary embodiment, to data indicating that no sheets are stacked and the sheet size is unspecified. In step S1302, the CPU 201 determines whether any sheet is on the sheet tray 120c based on a result of detection by the tray sheet sensor 515. If the CPU 201 determines that no sheets are on the sheet tray 120c (NO in step S1302), the CPU 201 repeats the processing of step S1302. On the other hand, in step S1302, if the CPU 201 determines that a sheet is on the sheet tray 120c based on a result of detection by the tray sheet sensor 515 (YES in step S1302), the processing proceeds to step S1303. In step S1303, the CPU 201 detects a sheet size based on results of detection by the tray sheet width sensor 514 and the tray sheet sensors 516 and 517, and the sheet size determination table for the sheet tray 120c shown in Table 1 as described above.

Figure 7A:
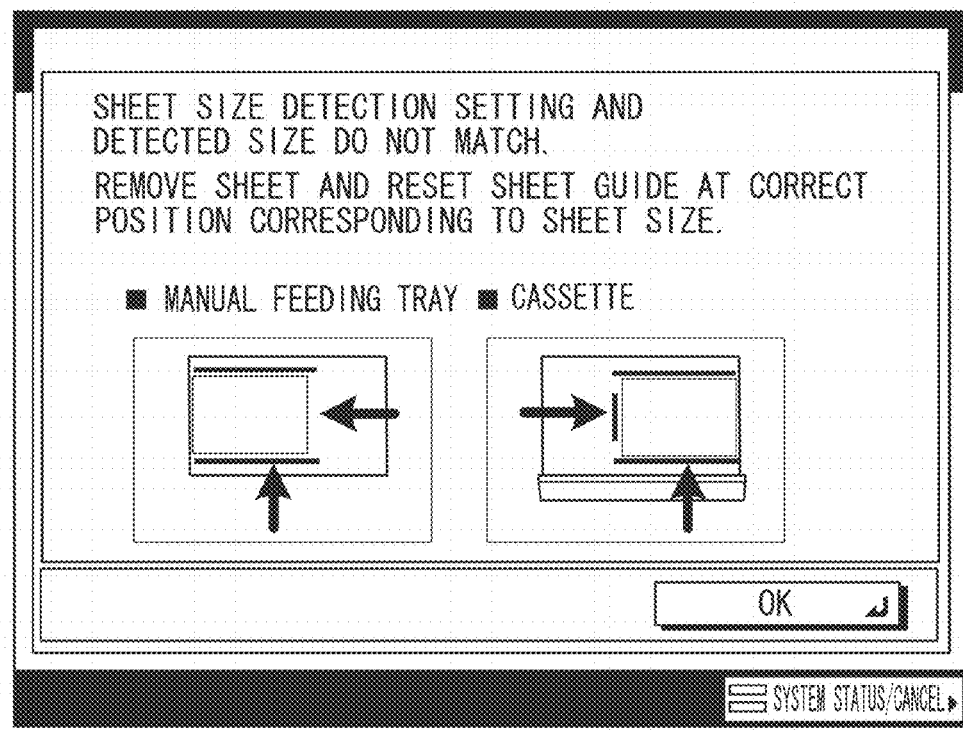
FIG. 7A illustrates a screen that prompts the user to reset a regulation guide according to the first exemplary embodiment.

In step S1304, the CPU 201 determines whether the determined sheet size is included in the set size group mode. More specifically, the CPU 201 performs the following determination processing based on the set size group mode, the sheet size detected in step S1303, and the size group mode table shown in Table 3. The CPU 201 determines whether the sheet size detected in step S1303 is set to be accepted as a result of detection at each of the sheet feeding units. In step S1304, if the CPU 201 determines that the determined sheet size is not included in the set size group mode (NO in step S1304), the processing proceeds to step S1305. In other words, if the detected sheet size is not accepted as a result of detection at each of the sheet feeding units, the processing proceeds to step S1305. In step S1305, the CPU 201 causes the operation control unit 204 to display, for example, a screen illustrated in FIG. 7A on the operation unit 1003. The screen illustrated in FIG. 7A is a screen that prompts the user to reset the sheet and the side regulation guides 512 and 513. The CPU 201 causes the operation control unit 204 to display on the touch panel unit 4001 (refer to FIG. 1B) of the operation unit 1003, for example, a message indicating that the size group mode setting (sheet size detection setting) and the sheet size (detected size) detected at the sheet feeding unit do not match and prompting the user to remove the sheet and reset the side regulation guides 512 and 513 in correct positions. The CPU 201 does not accept a result of detection at the sheet tray 120c, maintains the data in the RAM 203 in the state initialized in step S1301, and does not start the image forming operation. Accordingly, in the present exemplary embodiment, it is possible to notify the user before a sheet is conveyed onto the conveyance path (i.e., before the image forming operation is started) that the regulation plates of the sheet feeding unit may have been erroneously set.

On the other hand, in step S1304, if the CPU 201 determines that the sheet size detected in S1303 is included in the set size group mode (YES in step S1304), the processing proceeds to step S1306. That is, if the CPU 201 determines that the detected sheet size is accepted as a result of detection at each of the sheet feeding units, the processing proceeds to step S1306. In step S1306, the CPU 201 confirms the sheet size detected at the sheet tray 120c as the size of the sheet stacked on the sheet tray 120c. That is to say, the CPU 201 determines that the sheet of a size included in the set size group mode is correctly stacked on the sheet tray 120c. In step S1307, the CPU 201 replaces the data in the RAM 203 initialized in step S1301 with data indicating the presence of a sheet and specifying the sheet size detected at the sheet tray 120c. Then, the CPU 201 performs the image forming operation based on the sheet size detected at the sheet tray 120c.

In step S1308, the CPU 201 determines whether any sheet is on the sheet tray 120c. In step S1308, if the CPU 201 determines that a sheet is on the sheet tray 120c based on a result of detection by the tray sheet sensor 515 (YES in step S1308), the CPU 201 repeats the processing of step S1308. In this way, the CPU 201 maintains the state of the sheet tray 120c that is determined in step S1307 while the tray sheet sensor 515 detects that a sheet is on the sheet tray 120c. On the other hand, in step S1308, if the CPU 201 determines that no sheet is on the sheet tray 120c based on a result of detection by the tray sheet sensor 515 (NO in step S1308), the processing returns to step S1301.

As an alternative configuration, after a sheet is fed from the sheet tray 120c, a sheet sensor provided on the conveyance path may measure the length of the sheet in the conveying direction so that a size detected at the sheet tray 120c is compared with the measured size.

(Sheet Size Detection Processing at Cassette)

FIG. 8 is a flowchart illustrating an operation at the cassette 120a. In step S1401, after the power supply is turned on, the CPU 201 initializes data in a storage area of the RAM 203, which stores results of detection at the cassette 120a, to data indicating that no sheets are stacked and the sheet size is not unspecified. In step S1402, the CPU 201 determines whether the cassette 120a is stored in the storage portion 819 based on results of detection by the switches SW0, SW1, and SW2 of the cassette sheet width sensor 818 and the switches SW3, SW4, and SW5 of the cassette sheet length sensor 817. The CPU 201 determines that the cassette 120a is present if the cassette 120a is stored in the storage portion 819, whereas the CPU 201 determines that the cassette 120a is absent if the cassette 120a is not stored in the storage portion 819. In step S1402, in a case where all of the switches SW0 to SW5 are off, the CPU 201 determines that the cassette 120a is absent (NO in step S1402), and the CPU 201 repeats the processing of step S1402. On the other hand, in step S1402, if the CPU 201 determines that the cassette 120a is present (YES in step S1402), the processing proceeds to step S1403. In step S1403, the CPU 201 detects the sheet size as described above. More specifically, the CPU 201 detects the sheet size based on results of detection by the cassette sheet width sensor 818 (switches SW0 to SW2) and the cassette sheet length sensor 817 (switches SW3 to SW5), and the sheet size determination table for the cassette 120a in Table 2.

In step S1404, the CPU 201 determines whether the detected sheet size is included in the set size group mode. More specifically, based on the set size group, the size detected in step S1403, and the size group mode table shown in Table 3, the CPU 201 determines whether to accept the sheet size detected in step S1403 as a result of detection at the cassette 120a.

In step S1404, if the CPU 201 determines that the detected sheet size is not included in the set size group mode (NO in step S1404), the processing proceeds to step S1405. In other words, if the CPU 201 determines that the detected sheet size is not accepted as a result of detection at each of the sheet feeding units, the processing proceeds to step S1405. In step S1405, the CPU 201 causes the operation control unit 204 to display, for example, the screen illustrated in FIG. 7A on the operation unit 1003.

On the other hand, in step S1404, if the CPU 201 determines that the sheet size detected in step S1403 is included in the set size group mode (YES in step S1404), the processing proceeds to step S1406. In other words, if the CPU 201 determines that the detected sheet size is accepted as a result of detection at the cassette 120a in the size group mode setting, the processing proceeds to step S1406. In step S1406, the CPU 201 confirms the sheet size detected at the cassette 120a as the size of the sheet stacked in the cassette 120a. In other words, the CPU 201 determines that a sheet of a size included in the set size group mode is correctly stacked in the cassette 120a.

In step S1407, the CPU 201 starts a lift-up operation to lift up the sheet stacked in the cassette 120a to the height at which the sheet can be fed, as described above. In step S1408, the CPU 201 determines whether the cassette sheet sensor 820 detects a sheet. In step S1408, if the cassette sheet sensor 820 does not detect a sheet (NO in step S1408), then in step S1409, the CPU 201 determines whether a predetermined time has passed. If the CPU 201 determines that the predetermined time has not passed (NO in step S1409), the processing returns to step S1408. In step S1409, if the cassette sheet sensor 820 does not detect a sheet even after the predetermined time has passed, then in step S1410, the CPU 201 stops the lift-up operation. In step S1411, the CPU 201 determines that no sheets are stacked in the cassette 120a. Then, the CPU 201 stores in the RAM 203 the data indicating the absence of sheets and specifying the sheet size detected at the cassette 120a.

On the other hand, in step S1408, if the cassette sheet sensor 820 detects a sheet (YES in step S1408), the processing proceeds to step S1412. In step S1412, the CPU 201 stops the lift-up operation. In step S1413, the CPU 201 stores in the RAM 203 the data indicating the presence of a sheet and specifying the sheet size detected at the cassette 120a. Then, the CPU 201 performs the image forming operation based on the sheet size detected at the cassette 120a.

In step S1414, the CPU 201 determines whether the cassette 120a is stored in the storage portion 819, that is to say, whether the cassette 120a is present. In step S1414, based on results of detection by the cassette sheet width sensor 818 and the cassette sheet length sensor 817, the CPU 201 determines that the cassette 120a is present if any one of the switches SW0 to SW5 is ON, and the CPU 201 repeats the processing of step S1414. In this way, the CPU 201 maintains the data of the cassette 120a determined in step S1403 while the cassette 120a is detected to be present. In step S1414, based on results of detection by the cassette sheet width sensor 818 and the cassette sheet length sensor 817, if all of the switches SW0 to SW5 are OFF, the CPU 201 determines that the cassette 120a is absent, and the processing returns to step S1401.

As the foregoing describes, in step S1414, if the CPU 201 determines that the cassette 120a is absent, the processing returns to step S1401, and data indicating that no sheets are stacked and the sheet size is unspecified is stored in the RAM 203 as the state of the cassette 120a. Then, if the user sets sheets in the cassette 120a and then stores the cassette 120a in the storage portion 819, in step S1402, the CPU 201 determines that the cassette 120a is present. As an alternative configuration, after a sheet is fed from the cassette 120a, a sheet sensor provided on the conveyance path may measure the length of the sheet in the conveying direction so that a size detected at the cassette 120a is compared with the measured size. The operation at the cassette 120b is similar to the operation at the cassette 120a, and the description thereof is thus omitted.

As the foregoing describes, according to the present exemplary embodiment, the user can preset, as a size group mode, a sheet size series allowed for use. Then, in a case where a sheet size included in the size group mode set by the user as a size group mode not allowed for use is detected, the user is notified before the image formation is started that the sheet or the regulation plates may be set erroneously. Furthermore, in this case, the printing cannot be started. Thus, even when the user erroneously sets the sheet or the regulation plates, wasteful consumption of sheets and toner can be prevented.

Compared with the first exemplary embodiment, a feature of the second exemplary embodiment is an operation performed in a case where the detected sheet size is not included in the set size group mode. The configurations of the image forming apparatus and the like described in the first exemplary embodiment are similar to those in the second exemplary embodiment. Further, FIGS. 1A and 1B to FIGS. 5A and 5B and Tables 1 to 4 also apply to the present exemplary embodiment, and the same reference numerals are used. The following describes a size detection operation at the sheet tray 120c according to the second exemplary embodiment, and operations at the cassettes 120a and 120b according to the second exemplary embodiment.

(Sheet Size Detection Processing at Sheet Tray)

Figure 7B:
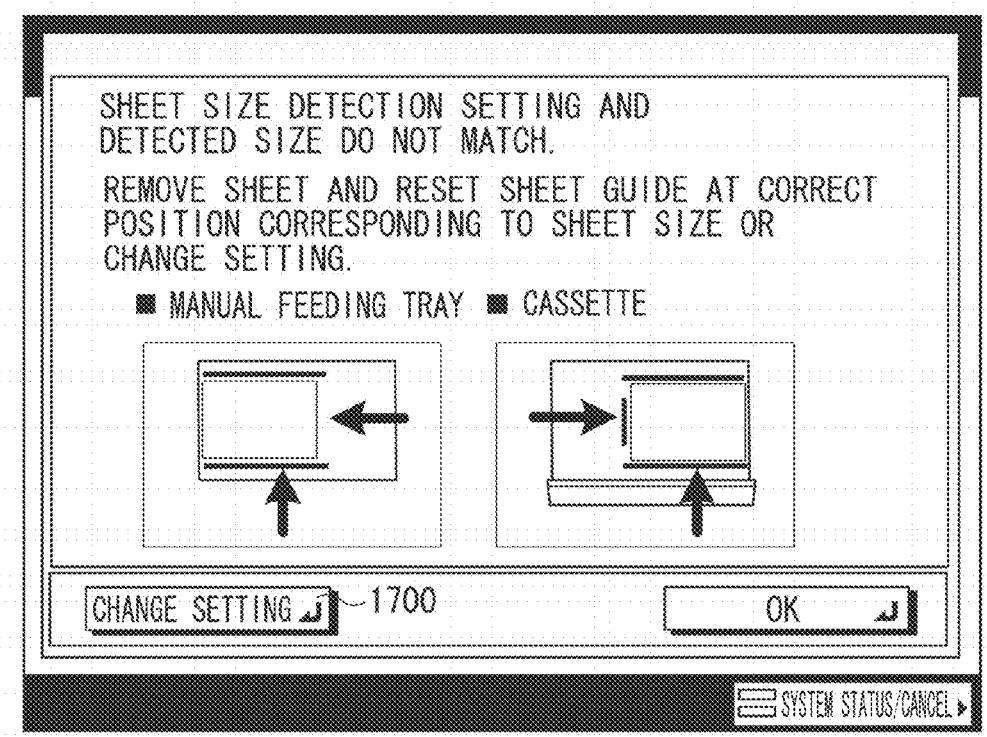
FIG. 7B illustrates a screen that prompts the user to reset the regulation guide or change a size group mode setting according to the first exemplary embodiment.

FIG. 9 is a flowchart illustrating the size detection processing at the sheet tray 120c according to the present exemplary embodiment. Steps S1601 to S1604 and S1606 to S1608 are similar to steps S1301 to S1304 and S1306 to S1308 in FIG. 6 described above in the first exemplary embodiment, and the description thereof is thus omitted. In step S1604, if the CPU 201 determines that the sheet size detected at the sheet tray 120c in step S1603 is not accepted as a result of detection at each of the sheet feeding units (NO in step S1604), the processing proceeds to step S1605. In step S1605, the CPU 201 causes the operation control unit 204 to display the screen illustrated in FIG. 7B on the touch panel unit 4001 of the operation unit 1003. The screen illustrated in FIG. 7B is a screen that notifies the user that the size group mode setting (sheet size detection setting) and the sheet size (detected size) detected at the sheet feeding unit do not match. Further, the screen illustrated in FIG. 7B is a screen for prompting the user to reset the sheet and the side regulation guides 512 and 513 (sheet guides) or change the size group mode setting. As the foregoing describes, the CPU 201 causes the operation control unit 204 to display on the touch panel unit 4001 of the operation unit 1003, for example, a message that prompts the user to remove the sheet and reset the sheet guides in the correct positions or to change the setting.

In step S1609, the CPU 201 determines whether the size group mode setting change is selected. To select the size group mode setting change, the user touches a setting change button 1700 on the screen displayed on the touch panel unit 4001, whereby the setting change is selected. Notification of information indicating that the setting change button 1700 is touched is provided to the CPU 201 via the operation input unit 306 of the operation control unit 204. In step S1609, if the CPU 201 determines that the size group mode setting change is selected (YES in step S1609), then in step S1610, the CPU 201 causes the operation control unit 204 to display on the touch panel unit 4001 the size group mode setting screen illustrated in FIG. 5A or 5B, and the processing returns to step S1604. In step S1604, the CPU 201 determines again whether the sheet size detected at the sheet tray 120c is included in the size group mode setting according to the setting changed in step S1610.

On the other hand, in step S1609, if the CPU 201 determines that the setting change is not selected (NO in step S1609), the CPU 201 determines that resetting of the sheet and the side regulation guides 512 and 513 is selected, and the processing proceeds to step S1608.

(Sheet Size Detection at Cassette)

FIG. 10 is a flowchart illustrating an operation at the cassette 120a according to the present exemplary embodiment. Steps S1801 to S1804 and steps S1806 to S1814 are similar to steps S1401 to S1404 and steps S1406 to S1414 in FIG. 8 described in the first exemplary embodiment, and the description thereof is thus omitted. In step S1804, if the CPU 201 determines that the sheet size detected in step S1803 is not accepted as a result of detection at each of the sheet feeding units (NO in step S1804), the processing proceeds to step S1805. In step S1805, the CPU 201 causes the operation control unit 204 to display the screen illustrated in FIG. 7B on the touch panel unit 4001 of the operation unit 1003.

In step S1815, the CPU 201 determines whether the setting change is selected. The procedure of the setting change by the user is similar to that described above with regard to FIG. 7B, and the description thereof is thus omitted. In step S1815, if the CPU 201 determines that the size group mode setting change is selected (YES in step S1815), then in step S1816, the CPU 201 causes the operation control unit 204 to display on the touch panel unit 4001 the size group mode setting screen illustrated in FIG. 5A or 5B, and the processing returns to step S1804. In step S1804, the CPU 201 determines again whether the sheet size detected at the cassette 120*a* in step S1803 is included in the size group mode according to the setting changed in step S1816.

On the other hand, in step S1815, if the CPU 201 determines that the setting change is not selected (NO in step S1815), the CPU 201 determines that resetting of the side regulation guides 812 and 813 is selected, and the processing proceeds to step S1814. The operation at the cassette 120*b* is similar to the operation at the cassette 120*a*, and the description thereof is thus omitted.

As the foregoing describes, according to the present exemplary embodiment, the user is notified that the sheet or the regulation plates may be erroneously set. In addition, the size group mode can be reset. Thus, even in a case where the sheet size series used by the user is changed, the setting can be changed with excellent operability and wasteful consumption of sheets and toner can be reduced.

The image forming apparatuses according to the first and second exemplary embodiments do not perform the printing operation with respect to the sheet storage units in which no sheets are stacked. Thus, the sheet storage units (the cassettes 120*a* and 120*b* and the sheet tray 120*c*) in which no sheets are stacked in FIG. 6, 8, 9, or 10 cannot be used in the printing operation, and only the sheet storage units in which sheets are stacked can be used in the printing operation.

Further, the first and second exemplary embodiments describe the configuration in which all the sheet storage units, i.e., one sheet tray and two cassettes has a sheet size detection function. However, in the case of an image forming apparatus having more sheet storage units, only some of the sheet storage units may have a sheet size detection function. Furthermore, even in a case where the sheet size series to be detected varies among the sheet storage units, a similar effect can be produced by the foregoing method.

Further, the first and second exemplary embodiments describe four size group modes corresponding to the size series (see Table 4) as examples of size group modes. However, a specific sheet size of a size series may be set as a user's size group. For example, suppose that the user sets only the B5 and A4 sizes of the A/B series as the sizes allowed for use. In this case, if the size detected at the sheet feeding units is the B4 or A3 size, the screen illustrated in FIG. 7A or 7B is displayed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-013409 filed Jan. 28, 2014, which is hereby incorporated by reference herein in its entirety.

What is claimed is:

1. An image forming apparatus comprising:
   a stacking portion on which a sheet is to be stacked;
   an image forming unit configured to form an image on a sheet fed from the stacking portion;
   a size detection unit configured to detect a size of a sheet stacked on the stacking portion;
   a determining unit configured to determine, regardless of a designated sheet size used in an image formation job, an effective size group usable for image forming from among a plurality of size groups, each of which has a different size series of a sheet;
   a notification unit configured to provide notification of information; and
   a control unit configured to adopt the sheet size detected by the size detection unit as a size for a sheet in a case where the detected size is included in the effective size group determined by the determining unit, and cause the notification unit to provide a warning in a case where the size of the sheet detected by the size detection unit is not included in the effective size group determined by the determining unit.

2. The image forming apparatus according to claim 1, wherein the size detection unit detects the size of the sheet as a standard size.

3. The image forming apparatus according to claim 2, wherein the size detection unit includes a length sensor configured to detect a length of the sheet in a conveyance direction of the sheet and a width sensor configured to detect a width of the sheet in a direction orthogonal to the conveyance direction, and
   wherein the size detection unit detects the size of the sheet based on a result of detection by the length sensor and a result of detection by the width sensor.

4. The image forming apparatus according to claim 2, wherein the determining unit determines at least one of inch-size series, A-size series, B-size series, and K-size series as the effective size group.

5. The image forming apparatus according to claim 1, wherein, in a case where the size of the detected sheet is not included in the effective size group, the control unit causes the notification unit to provide notification to prompt a user to restack the detected sheet stacked on the stacking portion.

6. The image forming apparatus according to claim 1,
   wherein the stacking portion includes a regulation member that is movable and configured to regulate a position of the stacked sheet,
   wherein the size detection unit detects the size of the sheet based on a position of the regulation member, and
   wherein, in a case where the size of the detected sheet is not included in the effective size group, the control unit causes the notification unit to provide notification to prompt the user to adjust the position of the regulation member.

7. The image forming apparatus according to claim 1, wherein, in a case where the size of the detected sheet is not included in the effective size group, the control unit causes the notification unit to provide notification to prompt the user to change the effective size group.

8. The image forming apparatus according to claim 1,
   wherein a plurality of the stacking portions is provided, and
   wherein the determining unit independently determines, for each of the plurality of stacking portions, the effective size group.

9. The image forming apparatus according to claim 1, wherein, in a case where the size of the detected sheet is not included in the effective size group, the control unit prohibits initiation of image formation using the detected sheet stacked on the stacking portion.

10. The image forming apparatus according to claim 1, wherein the determining unit determines at least one size group which is manually selected from among the plurality of the size groups as the effective size group.

11. The image forming apparatus according to claim 1, further comprising a memory configured to store area information indicating an area where the image forming apparatus is used,
wherein the determining unit determines the effective size group according to the area information.

12. An image forming apparatus comprising:
a stacking portion on which a sheet is to be stacked;
an image forming unit configured to form an image on a sheet fed from the stacking portion;
a size detection unit configured to detect a size of a sheet stacked on the stacking portion;
a determining unit configured to determine, regardless of a designated sheet size used in an image formation job, an effective sheet size usable for image forming from among a plurality of sheet sizes;
a notification unit configured to provide notification of information; and
a control unit configured to adopt the sheet size detected by the size detection unit as a size for a sheet in a case where the detected size is included in the effective sheet size determined by the determining unit, and cause the notification unit to provide a warning in a case where the size of the sheet detected by the size detection unit is not included in the effective sheet size determined by the determining unit.

13. An image forming apparatus comprising:
a stacking portion on which a sheet is to be stacked;
an image forming unit configured to form an image on a sheet fed from the stacking portion;
a size detection unit configured to detect a size of a sheet stacked on the stacking portion;
an obtaining unit configured to obtain area information indicating an area where the image forming apparatus is used,
a determining unit configured to determine an effective size group usable for image forming from among a plurality of size groups, each of which has a different size series of a sheet, based on the area information;
a notification unit configured to provide notification of information; and
a control unit configured to adopt the sheet size detected by the size detection unit as a size for a sheet in a case where the detected size is included in the effective size group determined by the determining unit, and cause the notification unit to provide a warning in a case where the size of the sheet detected by the size detection unit is not included in the effective size group determined by the determining unit.

14. The image forming apparatus according to claim 13, further comprising a charging unit configured to manually charge an effective size group determined by the determining unit,
wherein the control unit adopts the sheet size detected by the size detection unit as a size for a sheet in a case where the detected size is included in the effective size group changed by the changing unit, and cause the notification unit to provide a warning in a case where the size of the sheet detected by the size detection unit is not included in the effective size group changed by the changing unit.

15. The image forming apparatus according to claim 13, wherein the obtaining unit includes a memory which has stored area information indicating an area where the image forming apparatus is used.

16. An image forming apparatus comprising:
a stacking portion on which a sheet is to be stacked;
an image forming unit configured to form an image on a sheet fed from the stacking portion;
a size detection unit configured to detect a size of a sheet stacked on the stacking portion;
a determining unit configured to determine an ineffective size group unusable for image forming from among a plurality of size groups, each of which has a different size series of a sheet;
a notification unit configured to provide notification of information; and
a control unit configured to adopt the sheet size detected by the size detection unit as a size for a sheet in a case where the detected size is not included in the ineffective size group determined by the determining unit, and cause the notification unit to provide a warning in a case where the size of the sheet detected by the size detection unit is included in the ineffective size group determined by the determining unit.

17. An image forming apparatus comprising:
a stacking portion on which a sheet is to be stacked;
an image forming unit configured to form an image on a sheet fed from the stacking portion;
a size detection unit configured to detect a size of a sheet stacked on the stacking portion;
a determining unit configured to determine an effective size group usable for image forming from among a plurality of size groups including inch-size series and A-size series;
a notification unit configured to provide notification of information; and
a control unit configured to adopt the sheet size detected by the size detection unit as a size for a sheet in a case where the detected size is included in the effective size group determined by the determining unit, and cause the notification unit to provide a warning in a case where the size of the sheet detected by the size detection unit is not included in the effective size group determined by the determining unit.

* * * * *